United States Patent [19]

Joan et al.

[11] Patent Number: 5,311,376

[45] Date of Patent: May 10, 1994

[54] INFORMATION DETECTING SYSTEM

[75] Inventors: David B. Joan, Trabuco Canyon; Michael R. Spaur, Irvine; Richard W. Hull, Laguna Hills; Takashi Asami, Huntington Beach; Marshall D. Lee, Newport Beach; Robert P. Mento, El Toro; Min-Hui Wang, Diamond Bar, all of Calif.

[73] Assignee: Western Digital (Singapore) PTE, Singapore, Singapore

[21] Appl. No.: 714,102

[22] Filed: Jun. 11, 1991

[51] Int. Cl.$^5$ .................. H03K 17/00; G11B 5/09
[52] U.S. Cl. ........................ 360/51; 328/72; 328/155
[58] Field of Search .............. 360/51, 77; 307/269; 328/63, 72, 155, 139

[56] References Cited

U.S. PATENT DOCUMENTS

| | | | |
|---|---|---|---|
| 4,027,338 | 5/1977 | Kril et al. | 360/77 |
| 4,280,099 | 7/1981 | Rattlingourd | 328/63 |
| 4,459,701 | 7/1984 | Lamiral et al. | 328/133 |
| 4,511,938 | 4/1985 | Betts et al. | 360/77 |
| 4,669,004 | 5/1987 | Moon et al. | 360/77 |
| 4,910,617 | 3/1990 | Brunnett et al. | 360/78 |
| 5,103,466 | 4/1992 | Bazes | 328/139 |
| 5,197,086 | 3/1993 | Jackson et al. | 328/72 |

Primary Examiner—William L. Sikes
Assistant Examiner—Toan Tran
Attorney, Agent, or Firm—Skjerven, Morrill, MacPherson, Franklin, and Friel

[57] ABSTRACT

An integrated servo system for a disk drive employing sector servo positioning information on concentric tracks of a recording medium utilizes a servo burst pattern with three sequentially occurring servo bursts. One burst is positioned to have a maximum amplitude plateau on a track centerline of alternate tracks, and the other two bursts have maximum plateau values at locations between the centerlines of adjacent tracks. The amplitudes of the bursts are sequentially detected by a peak detector and supplied to sample and hold circuitry for measuring their relative amplitudes. Discriminator circuitry utilizes a window to provide two samples of each transition in the servo pattern and compares the samples to detect different fields and events in the pattern.

12 Claims, 16 Drawing Sheets

INFORMATION DETECTING SYSTEM

BACKGROUND OF THE INVENTION

1. Field of the Invention

The present invention relates generally to servo systems for controlling the position of one or more read/write heads relative to the different concentric tracks on a disk drive employing a sector servo system.

2. Prior Art

In disk drives employing sector servo information, in which sectors of servo information are interspersed with blocks of data circumferentially in concentric tracks around the surfaces of the disk or disks, a servo format pattern is usually employed which contains information such as a track number identifying field, a synchronizing field which synchronizes the data reading devices with the data rate on the disk drive, and a servo burst field for providing information to control the positioning of the heads which read and write information from and to the disk surfaces.

One operation phase of a disk drive servo system is known as track seeking, in which the read/write head is driven across the disk from one track to another. By controlling the head motion velocity profile between tracks, such track seeking can be performed quite rapidly compared to other systems such as those with a stepper motor actuator, where the head has to step through (i.e., start and stop) at essentially a constant velocity. This track seeking operation in a sector servo system can be conducted most efficiently when the recorded servo block information includes such lateral positional information as track ID code, and the blocks are placed in a phase coherent fashion.

The operation phase of a disk drive servo system in which the read/write head is maintained over the centerline of the desired track is known as track following. During operation, the head position can be shifted from its desired position by a number of factors, such as the application of external force to the head. The servo system senses this drift in position by reading the servo bursts and comparing their amplitudes, and then corrects for the drift by moving the head back to the desired track centerline.

One prior art servo burst field pattern for use in disk drives, as shown in U.S. Pat. No. 4,669,004, contains four bursts of servo information labeled A, B, C, and D. All like bursts are separated from each other by four/thirds of one data track pitch. Each burst type is offset radially from the next adjacent other burst types by either one third or two thirds of the pitch of each data track. Since the actual width of a head is approximately two thirds of a track pitch, approximately one third track pitch nominally separates each data track from adjacent tracks. The servo burst pattern repeats itself every fourth track.

For each data track in this prior art servo pattern, two of the four bursts are equally offset from a track centerline by one third track pitch. For that track, one of the other bursts is entirely within the head width at that particular track, and the other is entirely outside the head width. This arrangement provides a quadrature pattern, so that the relative amplitudes of bursts read by the head at a known position will provide direction feedback information during track seeking operations. The position of the head is determined using the four servo bursts and conventional quadrature mathematical analysis techniques.

One disadvantage of this prior art four burst servo pattern is that it requires additional area on the disk to store the servo pattern in comparison to that required for a pattern having two or three servo bursts per sector. This additional area required for the servo pattern subtracts from the disk surface available for storing user data, thereby reducing the overall data capacity of the disk file.

Another prior art patent, U.S. Pat. No. 4,297,787 shows a sector servo pattern having two servo bursts in the servo field and utilizing a SYNC field following the servo bursts, the SYNC field being encoded to indicate whether the preceding servo burst information was valid or invalid.

Servo information is generally written in a form of a number of separate bursts of sine wave signals, each of which is physically written a half track away from adjacent bursts. For example, in the system of the present invention, three servo bursts, A, B and C are written, with the C burst written exactly on a track centerline, the A burst written a half track inside of the centerline, and the B burst written a half track outside the centerline. When these bursts are read with the head exactly on the track centerline, the system reads a normalized amplitude of 1.0 for the C burst and 0.5 for each of the A and B bursts. By comparing the amplitude differences of the A, B and C burst signals, the servo system can determine exactly where the head is with respect to the track centerline, and the head location may be adjusted by control of the head positioning actuator.

The servo system which this invention implements has servo bursts between each sector on the disk. Therefore, servo information must be written in such a manner that is readily distinguishable from the user data. The function of detecting such specially written information is called discrimination. In such a system, because the servo information also identifies the location of the user data area immediately following it, the discriminator must accurately detect the servo field in order for the system to be able to read/write in the data portion of the sector. Therefore, any false detection or mis-detection can not only affect the system throughput rate, but could also result in a loss of data.

Traditionally, such discrimination function is implemented in analog circuitry whose performance can be affected by environmental factors (temperature, humidity, power supply voltage, etc.) and by component variations. Additionally the discriminating criteria of such analog circuitry tends to be non-exact, which usually requires high precision components and costly factory adjustment.

A desirable alternative is to perform such discriminating function in digital logic circuitry which is more stable against environmental variations and in which detection criteria can be controlled in a more exact fashion.

SUMMARY OF THE PRESENT INVENTION

In one aspect, the present invention improves upon the prior art by providing a disk drive servo track format without long periods void of information. In addition, the servo burst format employed herein reduces the number of servo bursts on the disk in comparison to the four servo bursts in the prior art patent discussed above. The present servo burst format comprises a first servo burst C on alternate tracks of the magnetic storage medium, each of the C bursts having an amplitude plateau occurring when the head is located over the center of alternate tracks. Additional servo burst information in the form of a pair of spaced bursts A and B on the storage medium has alternating amplitude maximum plateau values at locations between the centerlines of adjacent tracks. When the detected amplitudes of the A burst and the B burst are equal, this indicates that the head is located over a track centerline. This use of three servo bursts per sector instead of the prior art four burst pattern results in a significant increase in the disk surface area available for storing user data, particularly in the case of files having a large number of sectors on each disk surface.

In another aspect, this invention encompasses a servo format pattern for maintaining a minimal interval between flux reversals in the servo pattern. The servo pattern of this invention includes an encoded synchronization field, and Grey coded cylinder or track number identification. The synchronization field of the present invention is encoded with a pattern such that, in addition to information indicating the start of a sector, information is obtained once per disk revolution to indicate a rotational index or home location of the disk track. As is well known in the art, such an index signal is generated in disk drives once per disk revolution to mark the rotational position of the disk track.

Further, the Grey coded track address field of this invention has no greater than two consecutive zeros therein, resulting in a transaction-rich pattern which minimizes the possibility of "drop in" noise pulses which could cause errors in the discrimination circuitry and also prevents time shifting of pulses which could occur if there were long periods with no transitions. Also, the pattern is coded so that the track address field cannot be misinterpreted as any other field in the servo pattern.

A further aspect of the present invention provides an improved architecture for a digital servo discriminator to be used in a servo controlled disk drive system. The discriminator's function is to distinguish a uniquely formatted servo information pattern from the remainder of the information on the recorded track. The invention employs a digital front end phase locked loop (PLL) circuit which adapts itself to the incoming signal pulse train to minimize the possibility of false detections and missed detections. A dual non-return-to-zero (NRZ) decoder and deserializer permits data evaluation for each phase of window function which the PLL generates. Combined with data qualifier circuitry, the circuitry can detect drop-in and/or drop-out error, and a sector interval timer and a timeout timer enable the circuitry to operate in a time-discrimination mode. All elements of the system are controlled by a central state machine for more exact control of discrimination criteria.

This aspect of the present invention tolerates a wider range of data rate variations, as well as drop-in and drop-out errors than prior art systems, is capable of handling more complicated servo formats, and provides for time discrimination mode with resultant higher reliability. The present system can accomplish all of this without requiring high precision analog components or factory adjustments that can affect its production cost. The present invention functions to discriminate the uniquely written servo information from the user data, identify a synchronizing mark (SYNC), retrieve track ID information, and use the derived timing information to control servo burst sampling by an analog to digital (A/D) converter and the automatic gain control (AGC) of the read channel.

An additional feature of the present invention involves a novel circuit arrangement for detecting and measuring the relative amplitudes of sector servo bursts from the novel pattern of three such bursts. A single peak detector circuit is employed to detect and temporarily store the amplitudes of the three sequentially occurring servo burst signals. Three sample-and-hold circuits have their inputs sequentially connected to the output of the peak detector. A logic circuit enables the sample-and-hold circuits and sequentially selects each sample-and-hold circuit to receive the temporarily stored input signal magnitude from the peak detector. The use of a single peak detector for the three sample-and-hold circuits eliminates the prior art need for a separate peak detector for each sample-and-hold circuit, thereby reducing the component cost for the entire system. Digital control of the sample-and-hold circuits allows the circuits to be activated based on an approximation of the anticipated time to receive the signal and the actual presence of a signal on the peak detector input.

An A/D conversion system is connected to the outputs of the sample-and-hold circuits for simultaneous evaluation of the peak value held in each of the three sample-and-hold circuits. This evaluation utilizes a ramp generator to provide a signal for differential comparison with the three sample-and-hold signals. Counter circuits time the ramp cross-over point for each differential comparison of magnitude. The enabling signal for each of the counters is calibrated to the peak detector bias level to delay enabling of the counters until the voltage ramp has reached a minimum reference value. The ramp generator is enabled digitally by the control logic after sequencing of the sample-and-hold circuits.

DESCRIPTION OF THE PREFERRED EMBODIMENT

Overall System

Figure 1A:
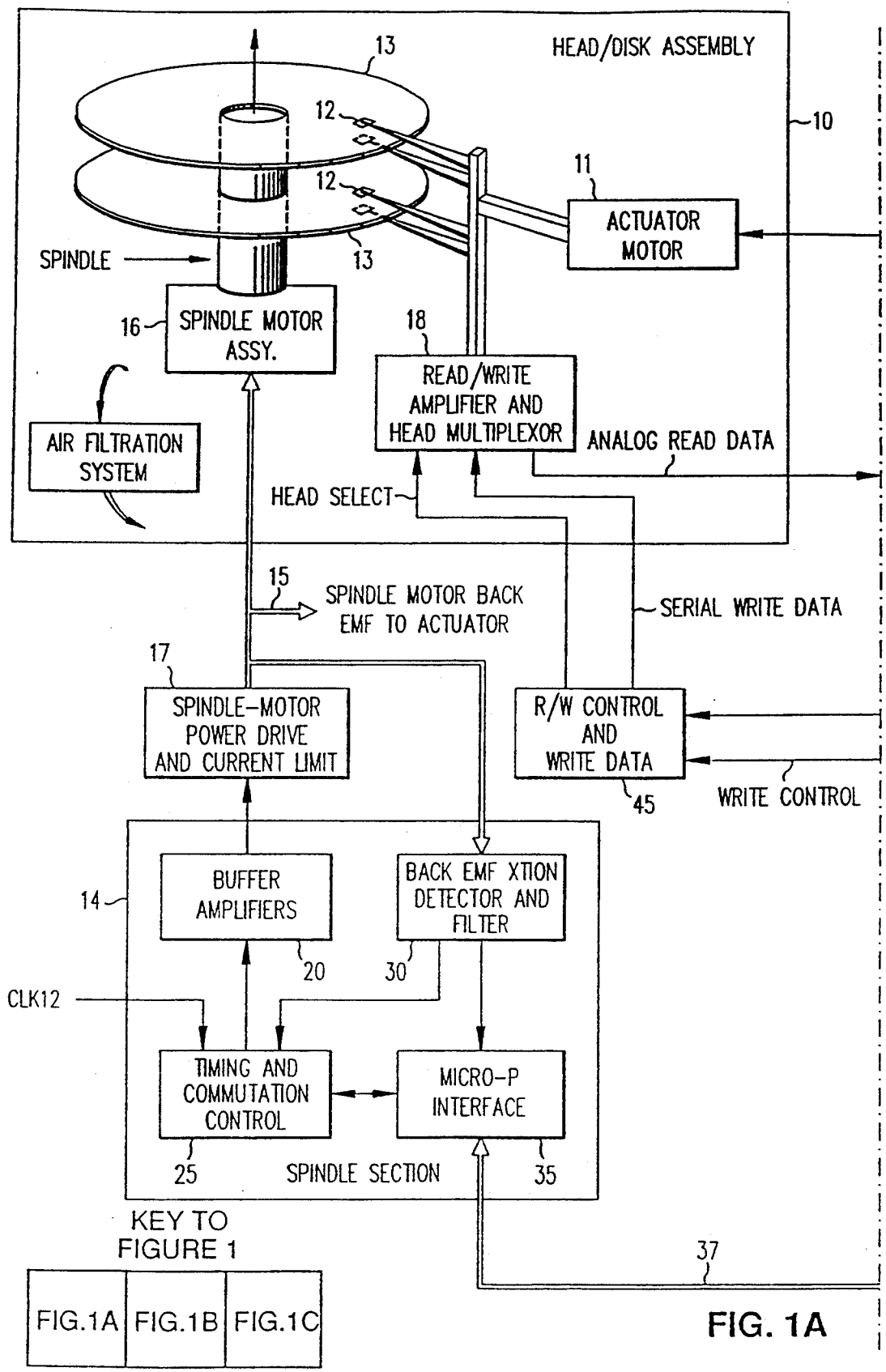
FIGS. 1A, 1B and 1C, when placed side by side, illustrate the mechanical and electrical components of a disk drive system in which the present invention may be employed.

Although the system will be described in connection with a magnetic disk drive, it will be apparent that the invention could also be employed in drive systems using other recording media such as optical. Referring to FIG. 1A, the disk file system includes a head/disk assembly (HDA) 10 having therein an actuator motor 11 which may include a voice coil actuator which positions one or more read/write heads 12 to different radial positions relative to the surfaces of disks 13 (two of which are shown in FIG. 1A) of a disk drive. Disks 13 contain a sector servo pattern in accordance with the present invention.

HDA 10 also includes read/write amplifier and head multiplexor circuitry 18 which is controlled through elements shown in enclosure 19 (FIG. 1B) and through read/write control circuitry 45 (FIG. 1A) for controlling the writing of data and the reading of data and servo information. Read/write amplifier and head multiplexor 18 may be a type SSI 32R510A/510AR Read/Write Device (510AR) manufactured by Silicon Systems of Tustin, Calif. That device provides a write current source which is controlled by an externally supplied write current signal and which supplies a write driver for generating a write current to be supplied through a multiplexor to the particular one of heads 12 selected for writing. The 510AR device also contains a read preamplifier and read buffer for supplying read data through the multiplexor from the particular head selected for reading. A mode select signal determines whether the device is to operate in a read mode or a write mode.

Read channel 19 includes a variable gain amplifier 21 which receives analog read data from circuitry 18 in the HDA and supplies it to a read channel analog filter 22. The output from circuitry 22 is supplied to AGC and pulse detect control circuitry 70 and to a pulse detector 23. The output of pulse detector 23 is supplied to a data separator 24 as raw digital read data. Element 19 also includes a buffer amplifier 8 which receives an input from READ channel analog filter 22 and supplies an output signal to a servo analog filter element 9. The output of servo analog filter 9 is supplied as a high level differential analog signal on a line 7 to analog sample and hold circuitry 49 (FIG. 1C), to be utilized in a manner which will be described in more detail below.

The output of data separator 24 (FIG. 1B) is supplied as synchronized serial read data on a line 26 to a digital data serializer/deserializer (SERDES) 27 in the SERDES section 28. Read data from circuitry 27 is supplied to a data control and buffer manager 29 whose output is supplied to a data buffer 31. An output from buffer manager 29 is supplied as a write control signal to circuitry 45 in FIG. 1A.

SERDES section 28 also includes an error correction code (ECC) encoder/decoder 33 for encoding and decoding ECC information in the data and other recorded information, as is well known in the art. Section 28 also has digital data encode/decode and address mark detection circuitry 40 connected to serializer/deserializer 28 and to ECC circuitry 33.

Element 28 further includes microprocessor interface circuitry 34 for interfacing with a microprocessor 36 (FIG. 1C) through a microprocessor bus 37 which carries address, control and data information, as is well known in the art. Microprocessor 36 has access to a random access memory (RAM) 38 and a read only memory (ROM) 39, as is common in the microprocessor art.

The system in which this invention is employed further includes a servo section 41 (FIG. 1C) for detecting and processing servo information from one or more of disks 13 relating to servo bursts, SYNC pulses and cylinder or track ID number indicating the radial position of heads 12 relative to the disk surface.

Figure 1B:
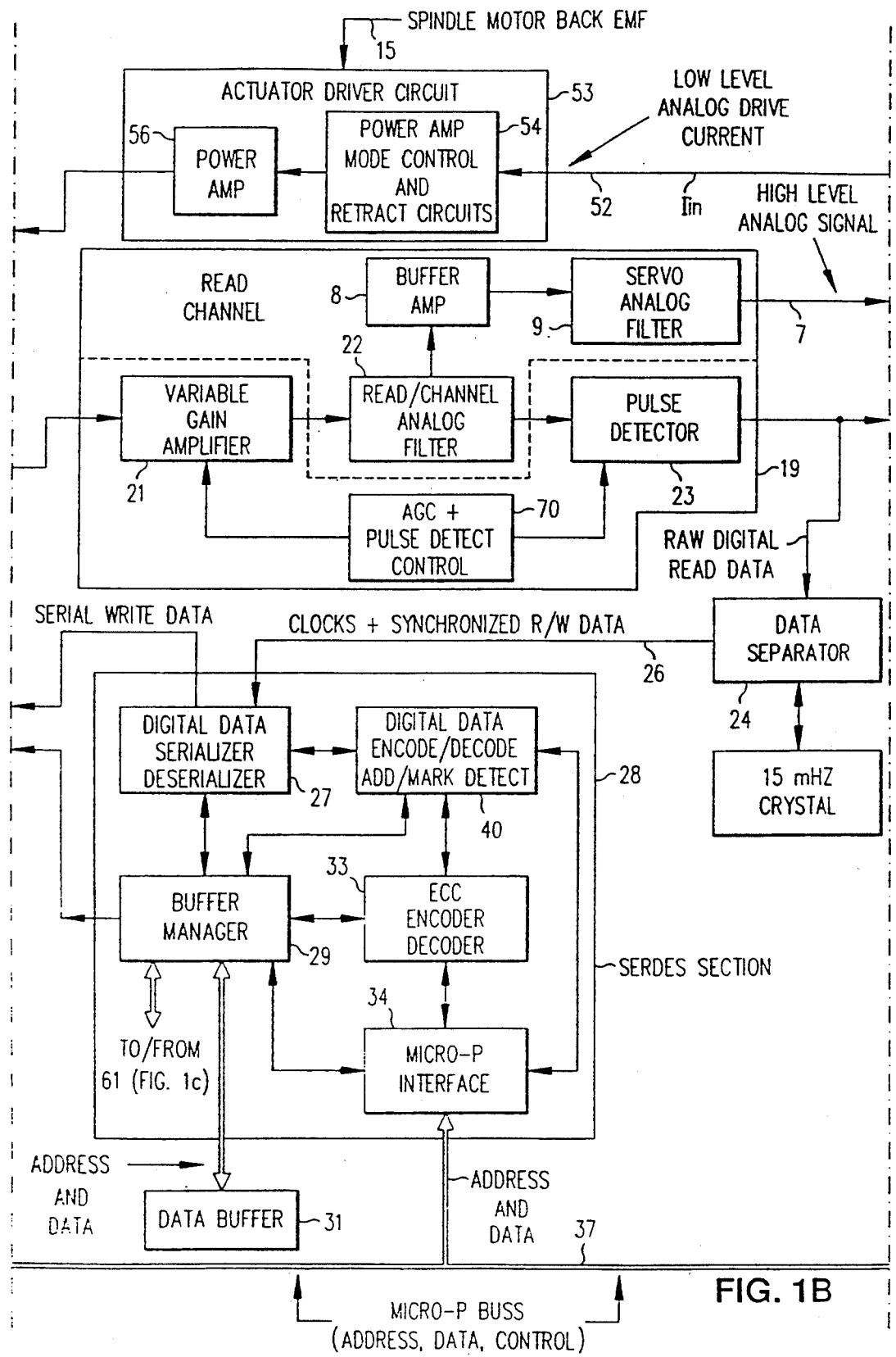
Figure 1C:
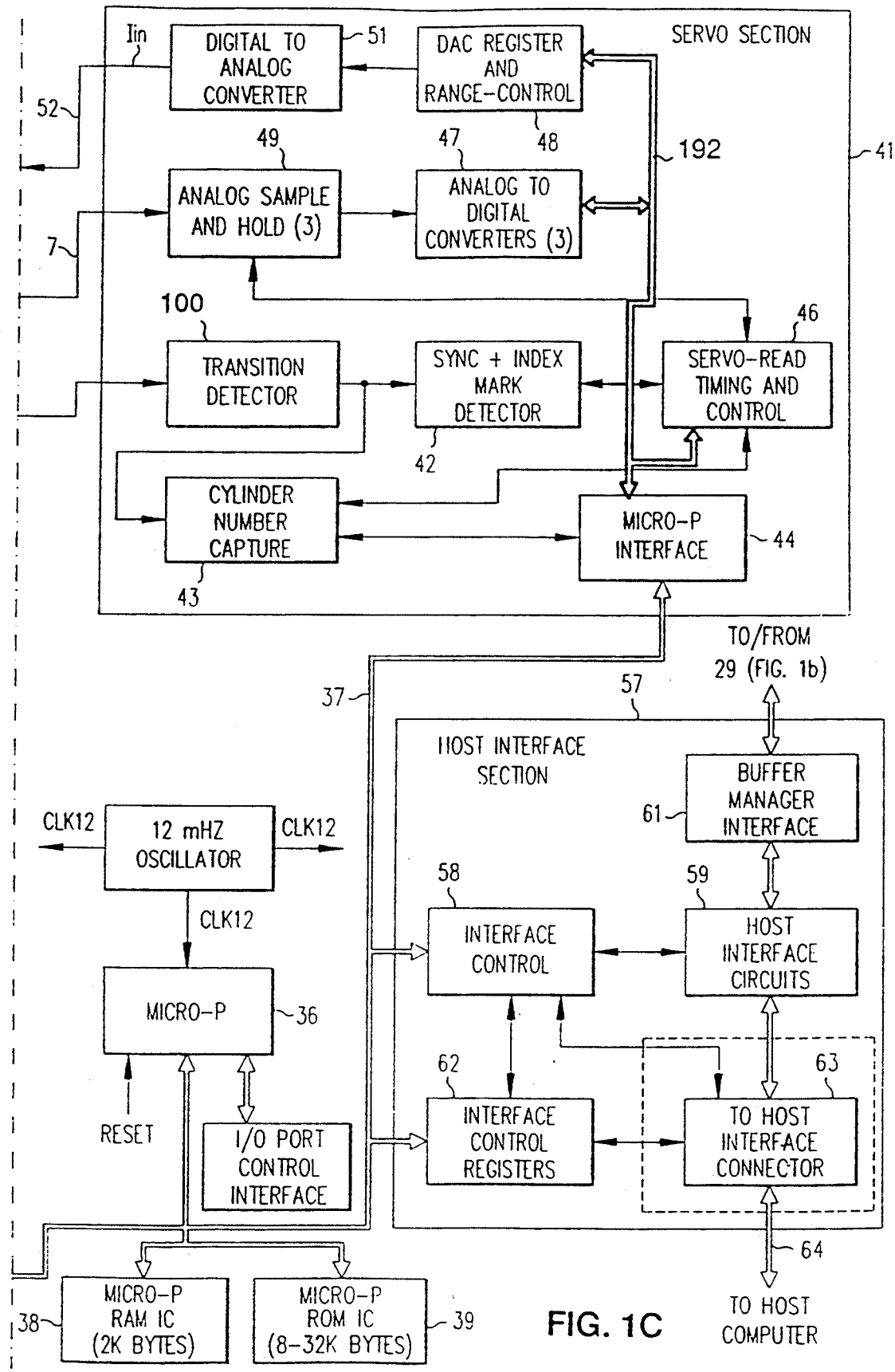

Servo section 41 includes SYNC and index mark detector circuitry 42 which receives information from pulse detector 23 in read channel 19 (FIG. 1B) through transition detector circuitry 100 (FIG. 1C). Circuitry 100 may be of the type shown and claimed in copending application Ser. No. 07/372,274, filed Jun. 27, 1989, titled "Pulse Detection Circuitry" and assigned to the same assignee as the present application. That application is incorporated herein by reference.

Circuitry 42 generates information relative to the detection of SYNC pulses and the index mark on the one of the surfaces of disks 13 from which a selected head 12 is reading. Circuitry 42 is connected to servo-read timing and control circuitry 46 which in turn is connected to cylinder number capture circuitry 43. Circuitry 43 generates an identification of the particular cylinder or radial position on the disks 13 at which heads 12 are located.

Servo section 41 also includes microprocessor interface circuitry 44 which connects to microprocessor 36 through bus 37 and operates to control, through a bus 192, the flow of information relative to servo read timing and control circuitry 46, analog-to-digital (A-to-D) converter circuitry 47 (which contains three such A-to-D converters in the preferred embodiment of the invention) and digital-to-analog (DAC) register and range control circuitry 48. Circuitry 47 receives three input signals from analog sample and hold circuitry 49, which signals represent the amplitudes of the different sector servo bursts A, B and C detected on the selected surface of one of disks 13, in a manner described in more detail below.

The output from circuitry 48 is supplied to digital-to-analog converter circuitry 51 which generates a low level actuator control signal $I_{in}$ on a line 52 (FIGS. 1B and 1C) which is supplied as an input to the actuator driver circuitry 53 (FIG. 1B). Circuitry 53 includes power amplifier mode control and retract circuitry 54 which supplies an actuator drive signal to a power amplifier 56 which in turn supplies control current to actuator motor 11 in HDA 10 (FIG. 1A). Circuitry 53 receives a signal on the line 15 which is a measure of the back E.M.F. of spindle motor 16 and which is used to supply power in actuator retract operations.

The overall system also includes a host interface section 57 (FIG. 1C) which includes interface control circuitry 58, host interface circuits 59, buffer manager interface circuitry 61, interface control registers 62, and a host interface connector 63. Buffer manager interface 61 communicates as indicated with buffer manager 29 shown in FIG. 1B. As is well known in the art, host interface section 57 operates to provide control and information paths between a host computer (not shown) through a bus 64 and the elements shown in FIGS. 1A, 1B and 1C through bus 37.

The portion of the system shown in FIG. 1A also includes a spindle motor control drive section 14 for controlling the spindle drive motor assembly 16 in HDA 10 through spindle motor power driver and current limit circuitry 17 for rotating magnetic disks 13. Spindle section 14 includes buffer amplifiers 20, timing and commutation control circuitry 25, back E.M.F. detector and filter circuitry 30 and microprocessor interface circuitry 35. As discussed above, line 15 connected electrically to spindle motor power 17 provides a measure of the back E.M.F. of the motor assembly and is supplied to the actuator positioning circuitry 53

Servo Pattern Format

Figure 2A:
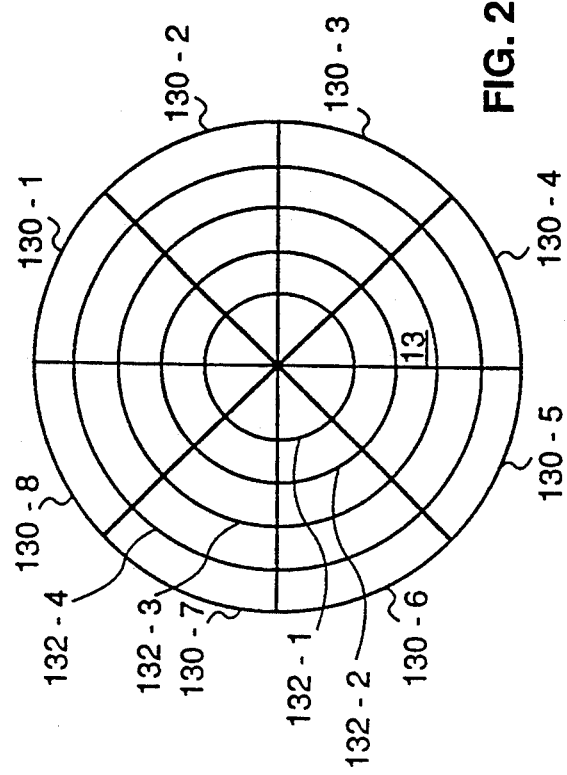
FIG. 2A is a graphical representation of the sectors and tracks of a typical data storage disk.

FIG. 2A is a graphical representation of the servo format of a surface of a disk 13. The disk is shown divided into sectors 130-1 through 130-8, the divisions between the sectors extending radially from the center of the disk to the disk's outer circumference. Servo information and data are stored on representative concentric tracks 132-1 through 132-4 which extend in concentric circles on the disk surface. While only four tracks are illustrated in the figure, a typical magnetic disk drive will have many more. Similarly, although for purposes of clarity in the drawing, only eight sectors 130-1 to 130-8 are shown in FIG. 2A, it will be understood that in practice many more such sectors are usually employed.

Figure 2D:
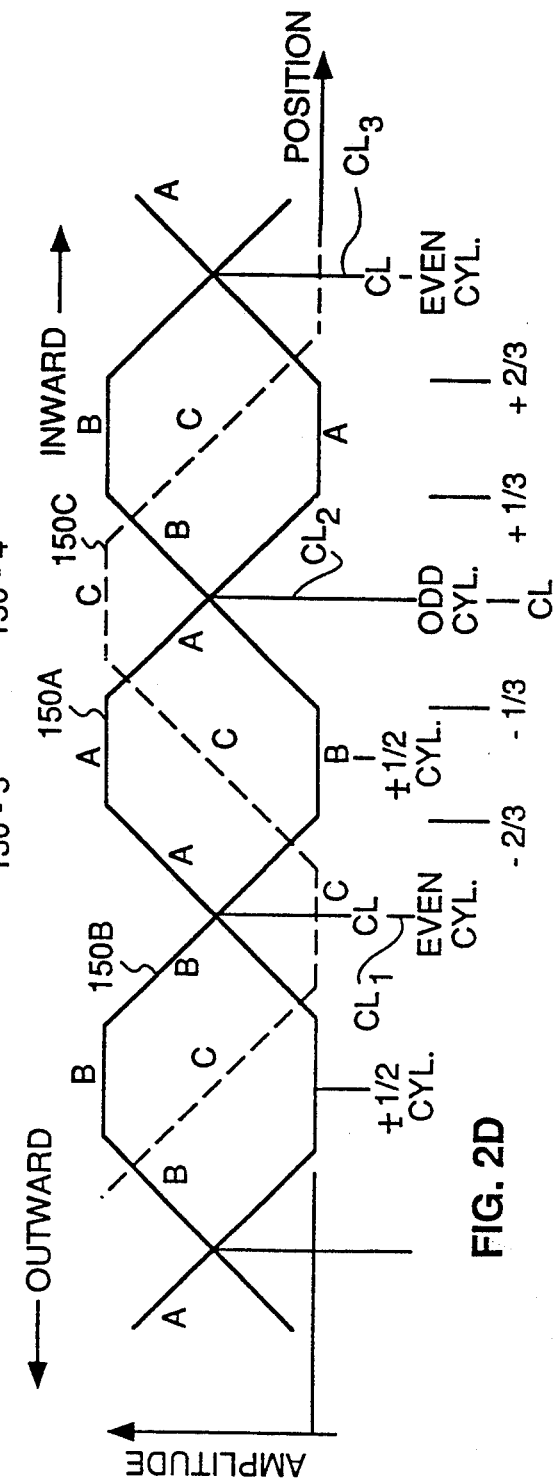
FIG. 2D is a graphical representation of the A, B, and C servo bursts showing their amplitude distribution radially across the surface of a disk relative to track centerlines.
Figure 2B:
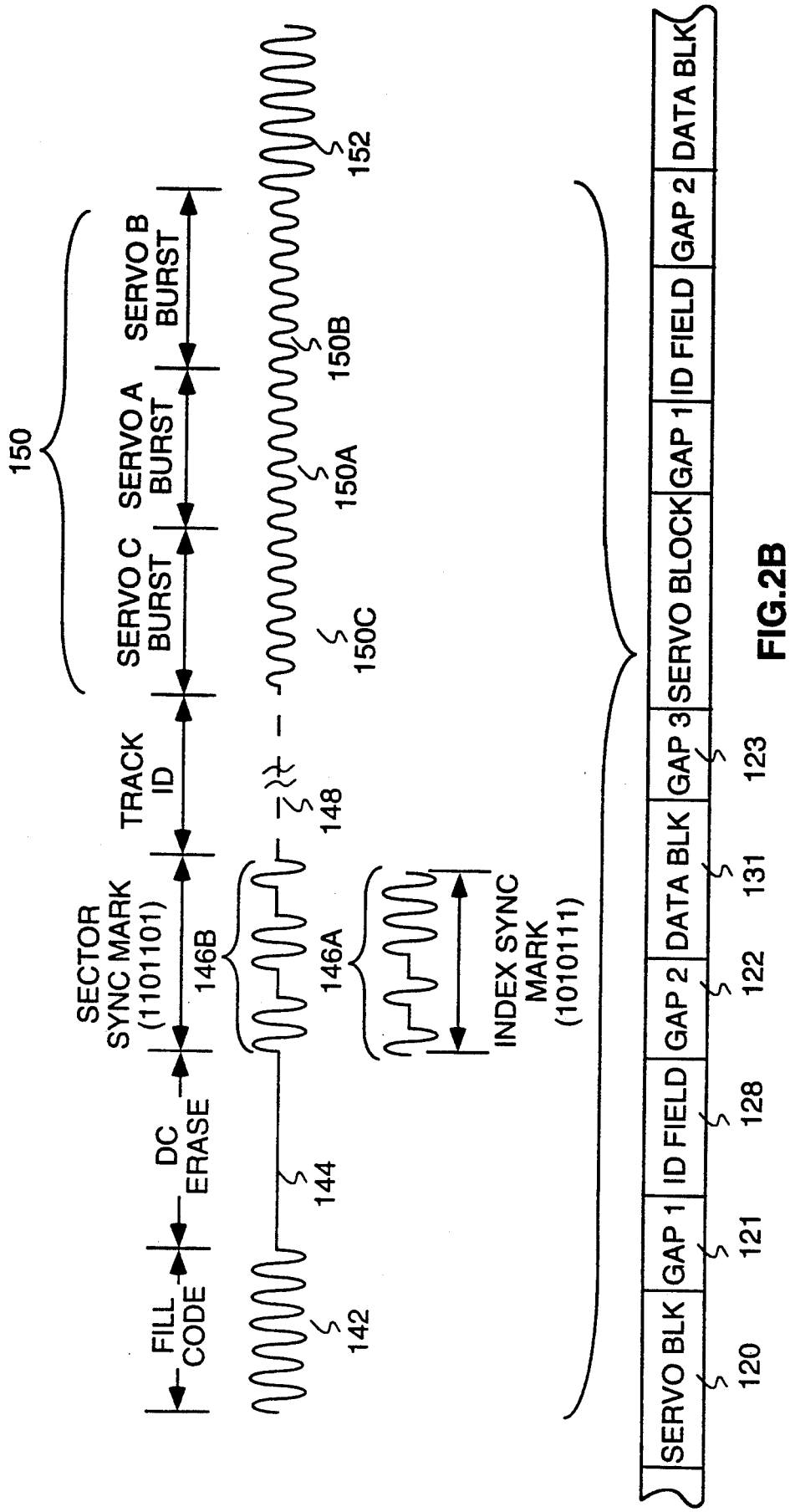
FIGS. 2B and 2C are diagrams of a servo format pattern according to the present invention.

The format for a portion of a track on a disk is shown at the bottom of FIG. 2B. The format for one sector, such as sector 130-6 of FIG. 2A, includes a servo block 120, an inter servo-ID field gap (or gap 1) 121, an ID field 128 for identifying user data block 131, an inter ID field-data block (gap 2) 122, a user data block 131, and an inter data block-servo block gap (gap 3) 123. The sector format is then repeated, with the servo block for the next sector immediately following gap 3. This pattern repeats itself around the disk, the particular layout depending on the size of the data blocks involved.

Figure 2C:
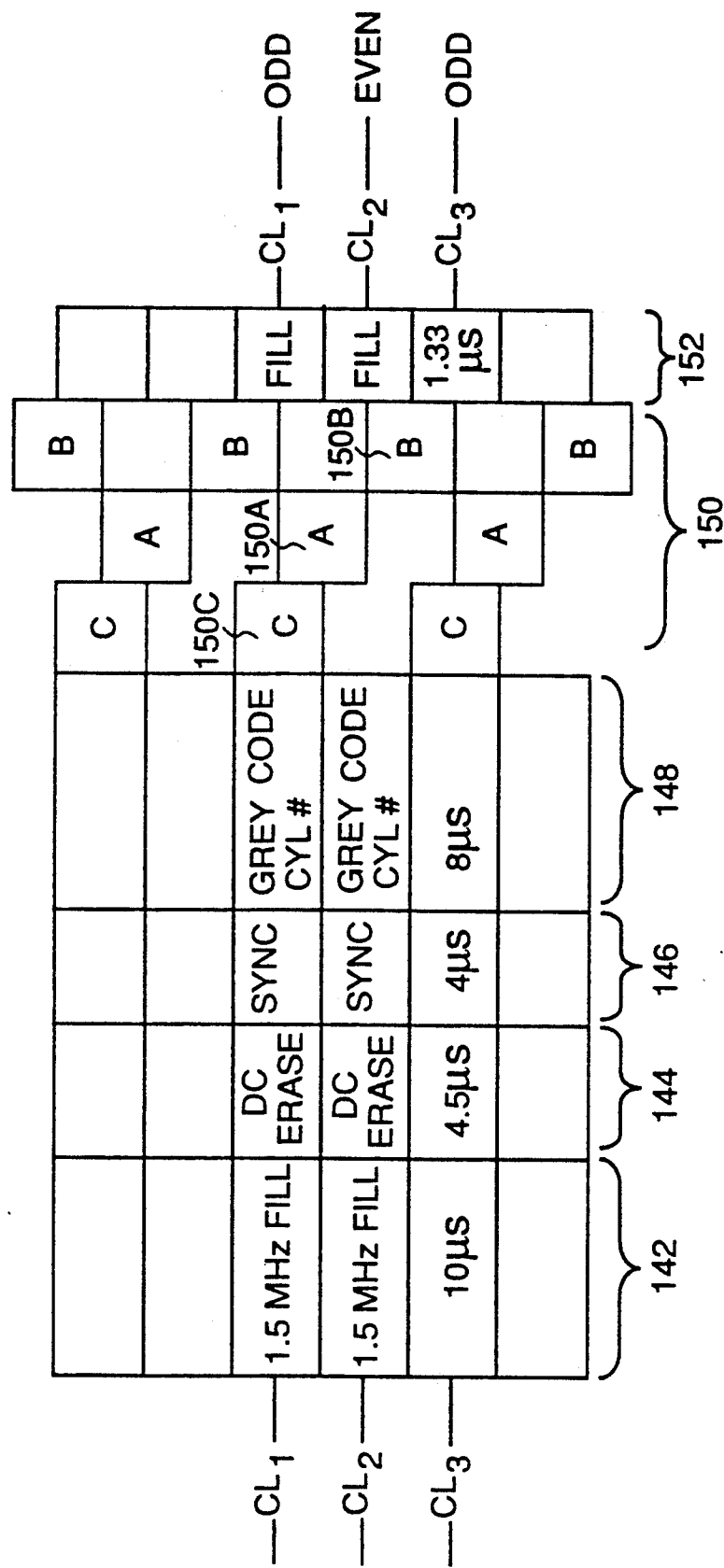

The format of the servo pattern within a servo block for a number of adjacent tracks is shown in FIGS. 2B and 2C. The waveforms for a single servo format block are shown at the top of FIG. 2B as they would appear on the serial read data lines output by the read-write amplifier 18 in FIG. 1A. Each servo pattern begins adjacent to one of the radial lines of FIG. 2A, representing the beginning of a sector, with a fill portion 142 which allows the reading circuitry to adjust its gain. Fill portion 144 also allows the digital PLL to achieve a lock to the incoming servo field information, as will be described below. Following portion 142 is a DC erase gap 144 having no transitions therein for a specified length. Field 142 is used to uniquely identify the servo field, since this no-transition situation is illegal anywhere else on the track.

After erase gap 144 there is a SYNC field 146. SYNC field 146 is encoded with a bit pattern which identifies this field as either a sector mark 146B or (once per disk revolution) an index mark 146A.

The next section of the servo pattern is an encoded track address field 148 which is preferably in the form of a twelve bit Grey coded address for identifying the number of the track being read. Following the track address 148 is the servo burst field 150 containing a C burst 150C, an A burst 150A and a B burst 150B. This is followed by another fill gap 152 which is a buffer zone provided to reduce interference if the write amplifier turns on to allow identification (ID) information to be written.

The detection of servo burst SYNC mark 146 is a 3 stage process Consisting of 1) detecting fill portion 142, 2) detecting DC erase gap 144, and 3) detecting the correct SYNC pattern for index or sector, in that order. A certain number of cycles of fill in gap 142, all 1 bits, are qualified by frequency and symmetry, and then the longer period of DC erase in gap 144 is employed and the SYNC pattern is qualified by having to match 1 of 2 pattern masks to detect either index or sector. The length of the DC erase gap 144 preceding SYNC field 146 is chosen to be longer than the bit-to-bit spacing of the 2,7 run length limited data coding preferably employed herein. This helps avoid detecting false SYNC fields in the following 512 byte data fields. Representative time durations for fields 142, 144, 146, 148 and 152 are shown in FIG. 2C, but these are not meant to be limiting the invention in any way.

The servo bursts A, B and C are written by a servo writer in a "phase coherent" manner so that no cancellation of the pulses or cycles occurs from one cylinder to the next. There is no 0.3 cylinder erased area between cylinders for the length of the servo burst, but there is a 0.3 cylinder erased area between cylinders everywhere else on the disk surfaces. Therefore, the flux transitions in the fill field 142 of the servo pattern are all in alignment on each track from the outside of the disk to the inside of the disk, with no gaps. The same applies to all fields within the servo burst. Thus, as the disk rotates, it is not possible for the heads to miss a servo burst no matter where the heads are positioned radially because each sector's servo pattern is a solid stripe from the outside to the inside. Also, even when the heads are moving at high velocity in a long seek, the servo bursts cannot be missed regardless of the angle of attack.

The only feedback from the drive to the microprocessor firmware actuator servo algorithm is the position information read from the servo bursts. The absolute position in whole cylinders relative to the outer crash stop location is determined by reading the 12 bit Grey code in field 148 of each servo sector, 1 per sector. The Grey codes are selected such that in moving across the disk surface one cylinder at a time, only one bit in the Grey code changes at a point halfway between adjacent cylinder centerlines. Secondly, the Grey codes are translated in firmware through table lookup into decimal cylinder numbers which increase sequentially starting at the outer crash stop position in the drive.

Additionally, no Grey code has more than two consecutive zeros in it. The three reasons for this last restriction are: 1) it limits the amount of DC erase in the Grey code pattern to 2 bit cells, which is smaller than erase field 144 so that the discriminator will not falsely detect SYNC within the Grey code if it missed the true SYNC preceding the Grey code, 2) it minimizes the probability of "drop in "s which are undesired noise pulses which cause an error in the value read by the discriminator, and 3) large periods of no transitions in the track ID field 148 can cause shifting in time of the pulses from the read channel such that the pulses do not fall in the correct "window" to be detected by the discriminator.

In the phase coherent system of the present invention, each track contains as many servo information blocks as there are sectors in the track. In such a system, where each track has an equal number of sectors (and thus servo blocks), each servo block is placed in exactly the same position on all tracks. This "exact placement" is implemented down to the bit level, so that if the read/write head crosses through several sectors during a seek operation, the system can still read the exact servo block format information including fill code, DC erase, SYNC mark and track ID.

Servo burst information during this phase of a seek operation is not very useful for positioning purposes, since the head is moving, and the position where a C burst is read is different from where the A and B bursts are read. This phase coherent arrangement is utilized in the present invention in order to make the seek operation more efficient, so that the track ID information can be read and utilized while the head is moving, to confirm the head's track position, and so that the time interval between servo blocks remains constant, thereby simplifying the settling and track following operations at the new track position.

FIG. 2D illustrates in graphical form the amplitudes of the magnetic fields associated with the elements of the servo burst field 150 of FIG. 2B. These occur serially on the track in the order illustrated in FIG. 2B, first the C burst 150C, and the A burst 150A, and finally the B burst 150B. FIG. 2D shows the playback amplitude of the three servo bursts as a function of radial location on a disk surface. The servo bursts are aligned around track centerlines, representing the centers of data tracks, including the three track centerlines, CL1, CL2, and CL3 shown in FIG. 2D. For the head to obtain the most accurate reading of the information stored in the track, it should be aligned precisely over a track centerline.

As shown in FIG. 2D, the A burst 150A and the B burst 150B have amplitude plateaus between alternating track centerlines. The A burst has an amplitude plateau between the first and second track centerlines CL1, CL2, while the B burst has an amplitude plateau between the second and third track centerlines CL2, CL3.

To determine whether the head is aligned over a track centerline, the head detects the A and B bursts and compares them. When the values of the A and B bursts are equal, for example at track centerline locations CL1, CL2 and CL3, the head is aligned directly over a track centerline. Details of circuitry for detecting and measuring the relative amplitudes of the A, B and C servo bursts are described below.

If the amplitudes of the A and B bursts are not equal, indicating that the head is not aligned on a track center, the servo system will operate head actuator 11 to move the head radially inward or outward to align it over a track center. When burst A or burst B are at a plateau, the C burst is used to determine position relative to the centerline. In FIG. 2D, the C burst has an amplitude plateau over the second track centerline CL2, and has a minimum value over the first and third track centerlines, CL1 and CL3.

As mentioned above, at track center the amplitudes read for the A and B bursts will be equal. These bursts are exactly 1 cylinder wide, located $\frac{1}{2}$ cylinder away from the center of a cylinder. From $-\frac{1}{2}$ cylinder to $+\frac{1}{2}$ cylinder relative to the track centerline, as shown by centerline CL2 in FIG. 2D, the amplitudes change linearly. From $-\frac{1}{2}$ cylinder to $-\frac{5}{8}$ cylinder, or $+\frac{1}{2}$ to $+\frac{5}{8}$ cylinder, the amplitudes do not change. This flat plateau region is due to the fact that the head is only $\frac{5}{8}$ as wide as a servo burst, so the head can travel a distance of $\frac{1}{8}$ cylinder without leaving the area where the burst has full amplitude. The other burst will have zero amplitude in that region. This characteristic of the servo playback shall be referred to as "flat-topping". When the heads are settled on the desired cylinder, and the microprocessor algorithm is trying to maintain them on the exact center of the track, the A and B bursts are sufficient for accurate positioning within the region of $-\frac{1}{2}$ track to $+\frac{1}{2}$ track.

However, there are two situations where the "flat-top" region is a handicap to good performance: First, at the end of a seek, the head is approaching the desired cylinder at low velocity, and it has to cross through the "flat-top" region at either $+\frac{1}{2}$ cylinder to $-\frac{1}{2}$ cylinder to get to the desired track centerline. It may see two or three servo bursts in a row while crossing this area. Since the A and B bursts are "flat", the servo firmware cannot determine at what velocity the heads are moving.

This is because the velocity control algorithm for the servo system is based on computed velocity compared to a desired velocity profile, but there is no measure in a two-burst system to indicate the velocity of the heads. The velocity is derived by computing (delta x)/(delta t), where delta x is new position minus old position and delta t is time per sector. If two bursts in a row are received in the "flat" region, the new position minus the old position is indicated as zero, so the servo system algorithm would indicate that the velocity is zero and would react by accelerating the actuator. This would be incorrect, since the actuator had not really stopped. Thus, in effect, a two-burst servo algorithm is "blind" in the "flat-top" area.

Additionally, during a seek, as the head crosses many cylinders, there will be servo bursts read where the A or B bursts are in their "flat-top" regions. The position reading will then be inaccurate by up to $\frac{1}{8}$ cylinder. This is not important at high seek velocities where the actuator is crossing as many as 20 cylinders between servo bursts, but it is increasingly important as the end of the seek approaches and the velocity approaches zero. The solution provided by the present invention is to add a third burst, the "C" burst.

The detected amplitudes of the A and B burst values vary with the gain of the read channel in the drive electronics and the head flying height. Some of the gain error is cancelled in the seek algorithm by "normalizing". Defining A="A burst amplitude measurement value" and B="B burst amplitude measurement value", then position error may be calculated as follows:

$$\text{position error} = \frac{A-B}{A+B} * \text{scale factor}$$

The A and B bursts are a pair of bursts 180 degrees out of phase. One approach would be to complement these with a pair of bursts, say C and D, which are identical but offset 90 degrees in phase, as in U.S. Pat. No. 4,669,004 discussed earlier. Then, when A and B are "flat", the C and D pair would be at the center of their linear region. These could then be "normalized" with a similar formula:

$$\text{position error} = +/- \tfrac{1}{2} cyl + \frac{C-D}{C+D} * \text{scale factor}$$

However, as indicated above, servo bursts subtract from the amount of disk surface available for storing data, so it is desirable that the size of the servo burst area be minimized. The approach of the present invention is to add only a C burst and then normalize it using A or B, whichever is at maximum (flat-topped), assuming the gain in reading A and B is the same gain as when reading C, which assumption will be true to a high degree of accuracy. The normalized position error can then be calculated as follows:

$$\text{position error} = +/- \tfrac{1}{2} cyl + \frac{2*(C-K)}{A+B} * \text{scale factor}$$

where K is the nominal value of C at exactly ½ cylinder from the track centerline. This is not quite as accurate as using both C and D bursts, but it is sufficiently accurate to provide good position feedback in the regions where A and B are "flat" and it does conserve disk area for user data.

Since bursts A, B and C all have the same period, which is 2 cylinders per cycle, A and B are used when within $-\tfrac{1}{4}$ to $+\tfrac{1}{4}$ cylinder of any cylinder center line, and C is used when at $+\tfrac{1}{4}$ to $+\tfrac{3}{4}$ cylinder away (or $-\tfrac{1}{4}$ to $-\tfrac{3}{4}$ cylinder away). During seeking, if reading the A and B bursts indicates they are "flat", then C is used to generate the fraction of a cylinder position information. During the very end of the seek, when the heads are about ½ cylinder from the desired cylinder centerline, the C burst provides reasonably good position information from which to derive the velocity. Thus, there is no "blind" spot in the servo system of the present invention.

The "whole number" cylinder from the Grey code in field 148 is placed in 8 to 12 bits in the microprocessor 36, through microprocessor interface 44 (FIG. 1C), and the "fraction" of a cylinder from either A minus B, or C is calculated to 8 bits by the microprocessor. Together, these provide the position of the heads in cylinders plus a fraction accurate to 1/256th of a cylinder.

It is important for phase alignment of the system clocks that the servo controller section is provided with a transition-rich stream of data. This can be achieved only if the data read from the disk is not void of transitions for periods of time. In the present invention, this is achieved with a transition-rich servo pattern. After the clock phase has been set by the PLL, it continues at that phase through the information in that servo pattern. When the head comes to the next sector, a new servo pattern is presented and the phase can be adjusted accordingly. It is preferred that the information read back from the servo pattern not be void of a transition for a period of greater than two and one-half cycle times except in the gaps.

As mentioned above, SYNC field 146 has encoded therein a bit pattern which identifies an index or home rotational position of the disk track once per disk revolution. For a SYNC field indicating that the head is at the index position, the SYNC field, for example, could have the bit pattern 1010111 encoded therein as shown in FIG. 2B. When the head encounters a SYNC field other than the one indicating the index position, field 146 could have encoded therein the bit pattern 1101101.

It will be seen that in both of these bit patterns there are no more than two adjacent zeros and the transition-rich frequency of the pattern is maintained.

The same approach may be taken to the track address field 148, the track address preferably containing twelve Grey coded bits and providing more than two thousand unique patterns with no more than two consecutive zeros. Each two adjacent encoded bit sequences differ in exactly one bit position and none of the more than 2000 possible encoded bit sequences contains more than two consecutive "0" bits.

Servo Discriminator

In the present system, the incoming signal time is encoded such that an encoded binary "1" is a full cycle sine wave and an encoded binary "0" is represented by a lack of any transitions for a duration of the equivalent period of the sine wave. This is done in order to maintain the phase coherency of the servo pattern. An external read channel means is used to derive a TTL compatible digital pulse train, designated in FIG. 3 as RDD, from the retrieved sine wave signals supplied by the head before input to the circuitry of the present invention. Since this process utilizes a peak detection circuitry, each encoded binary "1" consists of a pulse which when rectified contains two pulses a half period apart, commonly referred to as "di-bits".

The signal RDD is initially asynchronous to the internal system clock; therefore it must first go through transition detector/synchronizer 100. The preferred embodiment of the present invention utilizes a digitally controlled PLL 101 to allow for spindle motor speed variations, instantaneous speed variations and random jitters, all of which affect the input signal RDD. PLL 101 generates a clock information signal called WINDOW and having two parts, a high on "1" window and a low on "0" window. The WINDOW signal is supplied to NRZ decoder circuit 102 which also receives the incoming pulse coded signals from transition detector 100 and converts them to a serial NRZ format. PLL 101 operates to maintain the RDD pulses in the middle of the WINDOW function. A typical implementation in the prior art relies on the location of the first SYNC mark pulse to decode all subsequent patterns in an unadapted fashion, so that the range of the MSV, ISV and jitter it can tolerate tends to be extremely limited.

Figure 6A:
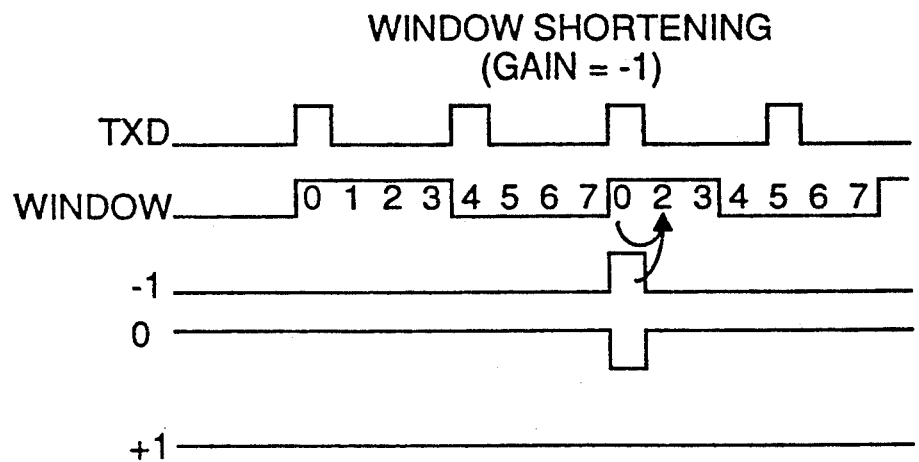
FIGS. 6A, 6B and 6C are timing diagrams showing different window function and phase timings.
Figure 6B:
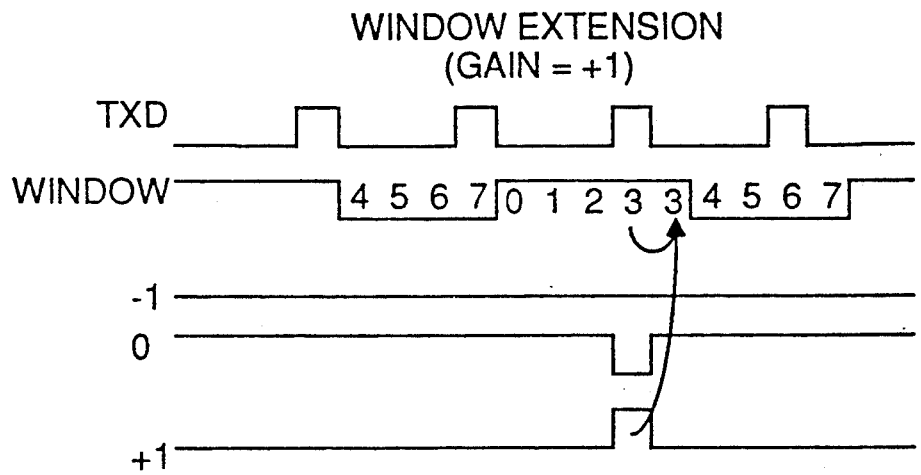

The RDD signal preferably is sampled eight times per sine wave period, giving the WINDOW function eight phases, four for high WINDOW (0, 1, 2, 3) and four for low WINDOW (4, 5, 6, 7), where the two transitions per sine wave period pulses can fall in. When the pulses fall in the phases close to the WINDOW edges (phases 0, 3, 4, 7 shown in FIG. 6C), the WINDOW extends or shrinks from its normal size by one clock cycle to bring the next anticipated pulse into a middle phase. As shown in FIG. 6A, when a transition pulse occurs at phase 0, where the loop gain is $-1$, the window shortens by eliminating phase 1 and skipping directly to phase 2. Conversely, as shown in FIG. 6B, when a transition occurs at phase 3, where the loop gain is $+1$, the window widens by repeating phase 3. The loop reacts only to the current input; therefore, it is a first order phase lock loop.

Because of the coarse resolution due to the low sampling rate, this type of loop can overreact to any phase error to throw itself out of synchronization. In order to prevent this, the preferred embodiment provides for a pattern matching circuit 103 (FIG. 3), which is shown in more detail in FIG. 4 and which functions as a digital band pass filter (BPF) to slow down the circuit reaction. It accomplishes this by matching the three consecutive incoming pulses to all possible digitized patterns of legal fill code (all "ones" code), rather than simply reacting to a single pulse. A typical prior art phase lock loop has a low pass filter after the phase detector, before the signal is fed back to the voltage controlled oscillator (VCO), whereas the present invention has an equivalent BPF at its input before it is fed to the phase detector. It is necessary to do this because the low sampling rate involved does not readily allow the digital elimination of overreaction, without performing a sophisticated signal processing operation.

Figure 4:
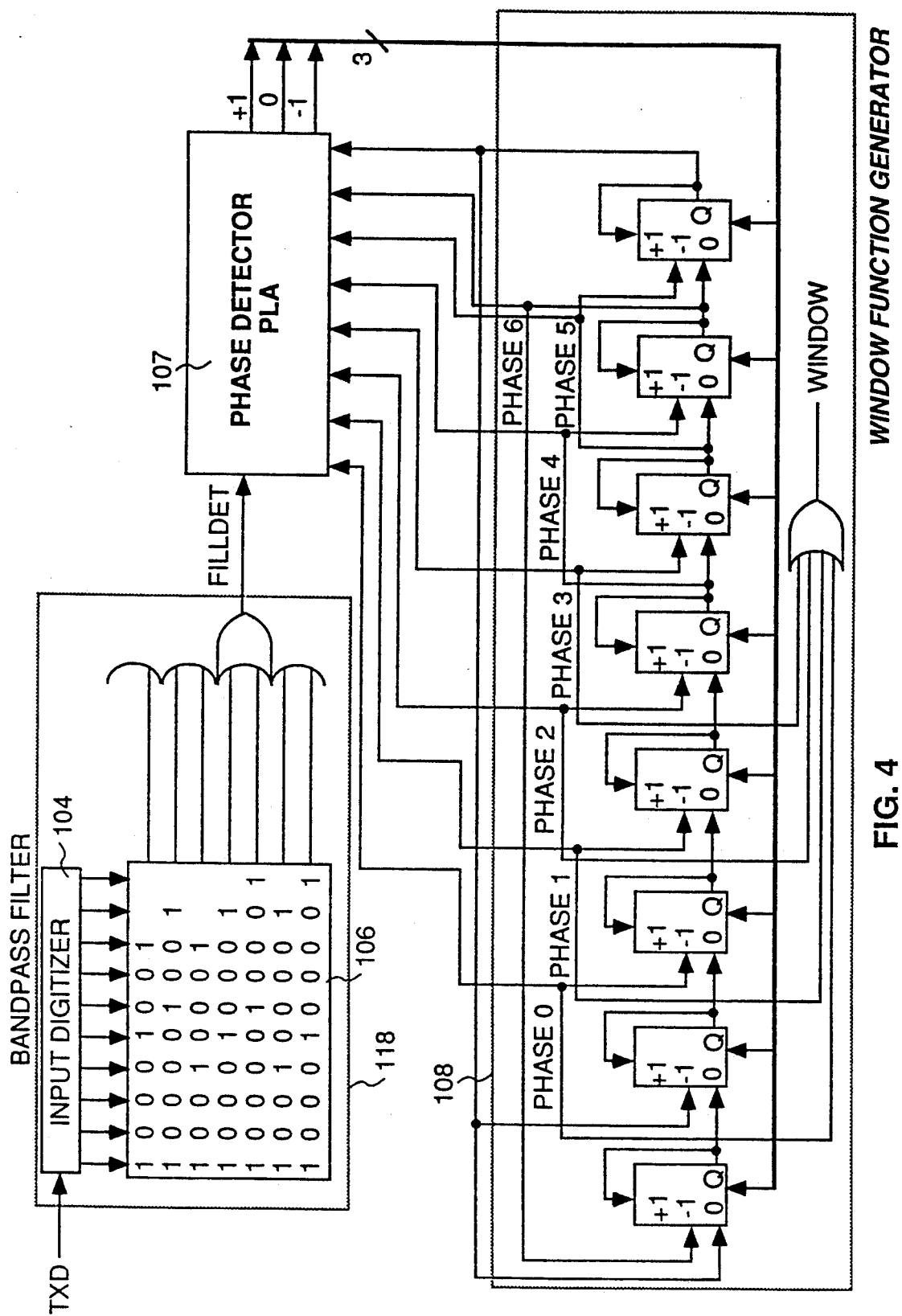
FIG. 4 is a schematic diagram of the modified digital phase lock loop and window function generator of this invention.

The digital band pass filter 103 preferably is implemented as shown in FIG. 4. The input TXD from transition detector 100 is shifted into an input digitizer 104, which is a 10-bit shift register clocked by the sampling clock, this clock being eight times faster than the sine wave frequency. The digitized signal is presented to a pattern match programmable logic array (PLA) 106, which attempts to match the digitized signal pattern to any one of the seven patterns shown in the PLA, which represent all possible digitized patterns which a valid fill code can have. If the presence of any of these patterns is detected, a FILLDET signal is asserted which is fed to a phase detector PLA 107.

Figure 6C:
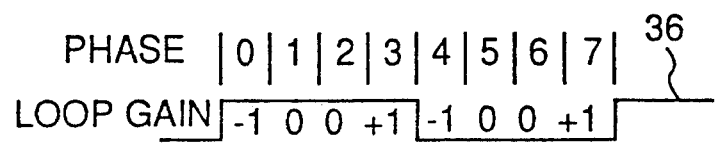

Phase detector PLA 107 receives eight input signals from a window function generator 108 which signify its current state. The FILLDET signal enables PLA 107 to generate its outputs +1, 0 and −1, depending on the current phase of the WINDOW. Those three output signals signify the current loop gain, where +1 means to extend a current WINDOW by a clock cycle, −1 to shorten it, and 0, no change. The loop gain as a function of the current WINDOW phase is shown in FIG. 6C. The manner of implementing both pattern match PLA 106 and phase detector PLA 107 are well known in the art and are not described further herein.

Figure 5:
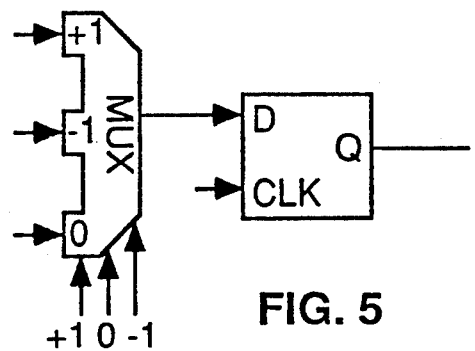
FIG. 5 illustrates circuitry for implementing a shift register for use in the invention.

The window function generator 108 is a serial sequence of eight special shift register elements, one of which is shown in detail in FIG. 5, to form a loop. Generator 108 is initialized to have only one "1" bit in the chain, and that single bit circulates around the loop. Normally, when "0" loop gain signal is asserted, the "1" bit shifts from one element to the next one. When "−1" is asserted, the "1" bit skips over one element on the next clock cycle, and when "+1" is asserted, the "1" bit stays one extra clock cycle in the same element. The three loop gain signals which are output from the phase detector PLA 107 are mutually exclusive.

An NRZ decoder 102 (FIG. 3) separates the incoming TXD signal train into two parts, a WINDOW "1" part and a WINDOW "0" part. Each part of the signal train produces an independent NRZ output signal, NRZA and NRZB, which correspond to the two transition pulses described above. These NRZA and NRZB signals are shifted into two independent deserializers, A (109) and B (111). Each deserializer is 12 bits deep so that it can contain the 12 bit track ID information.

Figure 8:
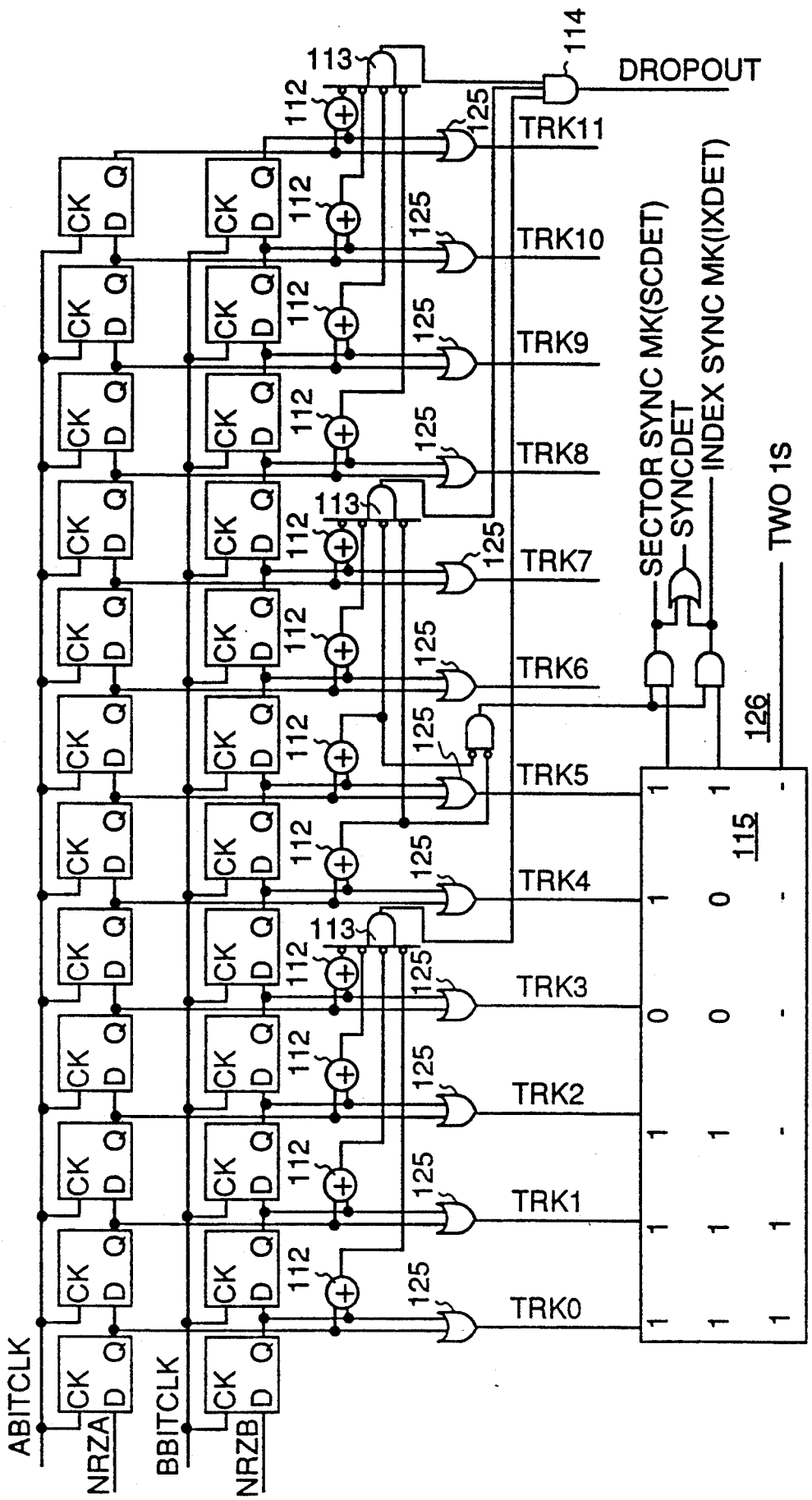
FIG. 8 is a schematic diagram of a deserializer for use in the discriminator feature of this invention.

The deserializers 109 and 111, shown in detail in FIG. 8, are duplicated because of uncertainty of leading phase and drop-in, drop-out errors. When the fill burst code is found and DC erase is examined, it is not certain which of the transition pulses (WINDOW high or low) leads the other; that is, which two transition pulses should be paired for decoding purpose, because the totally uniform fields such as fill code and DC erase do not indicate where a bit pattern starts and where it ends.

However, in order to be able to read the track ID information correctly, it is necessary to make that decision. Further, the phenomena known as bit drop-outs and drop-ins add complexity to this task. Media surface defects, external interference, inductive coupling, etc. can cause a sporadic pulse to appear where there should not be a pulse, or a pulse may drop out from where it should be. This suggests that the most common read error may be a bit where only one of the WINDOW parts contains a transition pulse. This can be a "1" bit with drop-out, or a "0" bit with drop-in. Statistically, drop-ins are much less likely to occur than drop-outs, so it is reasonable to assume that all such errors are drop-out errors.

The preferred embodiment of the invention decodes and deserializes each part of WINDOW independently, so that the information from either part is available. At the end of track ID read, the contents of deserializers 109,111 are compared with each other, and they should agree in the absence of any read error. This is accomplished by twelve exclusive OR gates 112, three NOR gates 113, and an AND gate 114, as shown in FIG. 8. Each of exclusive OR gates 112 receives inputs from a pair of associated A and B flip flops in the deserializer. The outputs of the deserializer A and B flip flops are also supplied through OR gates 125, and the least significant six of the outputs from gates 125 are supplied to a SYNC mark detector. The outputs of groups of four of OR Gates 112 are supplied as inputs to NOR gates 113 whose outputs are supplied as inputs to AND Gate 114. Thus, if one of exclusive OR gates 112 receives only a single input, its output is supplied to its associated NOR gate 113 which in turn energizes AND Gate 114 to signify a drop-out error.

In case of a discrepancy, the implementation of the invention follows the rule to assume all errors to be drop-out, but it provides the ability to allow for possible misjudgment to aid the system's decision to discard unrealistic results through the use of the twelve OR gates 125. A typical implementation in the prior art either assumes all errors are drop-ins, for ease of implementation, or is incapable of detecting either drop-in or drop-out errors.

As will be described in more detail below, the preferred embodiment of the invention decides the leading part of the window upon the detection of the SYNC mark 146A or 146B. It compares the contents of the deserializers, and if the contents of the least significant 6 bits match either of the SYNC marks, it decides which is the leading part by checking the current window part. The dual deserializer structure enables this action. In contrast, a typical implementation in the prior art relies on the first transition pulse after the DC erase field 144 being the leading phase. This makes it difficult to incorporate phase lock loop in the discrimination scheme, thus limiting its bandwidth.

Figure 3:
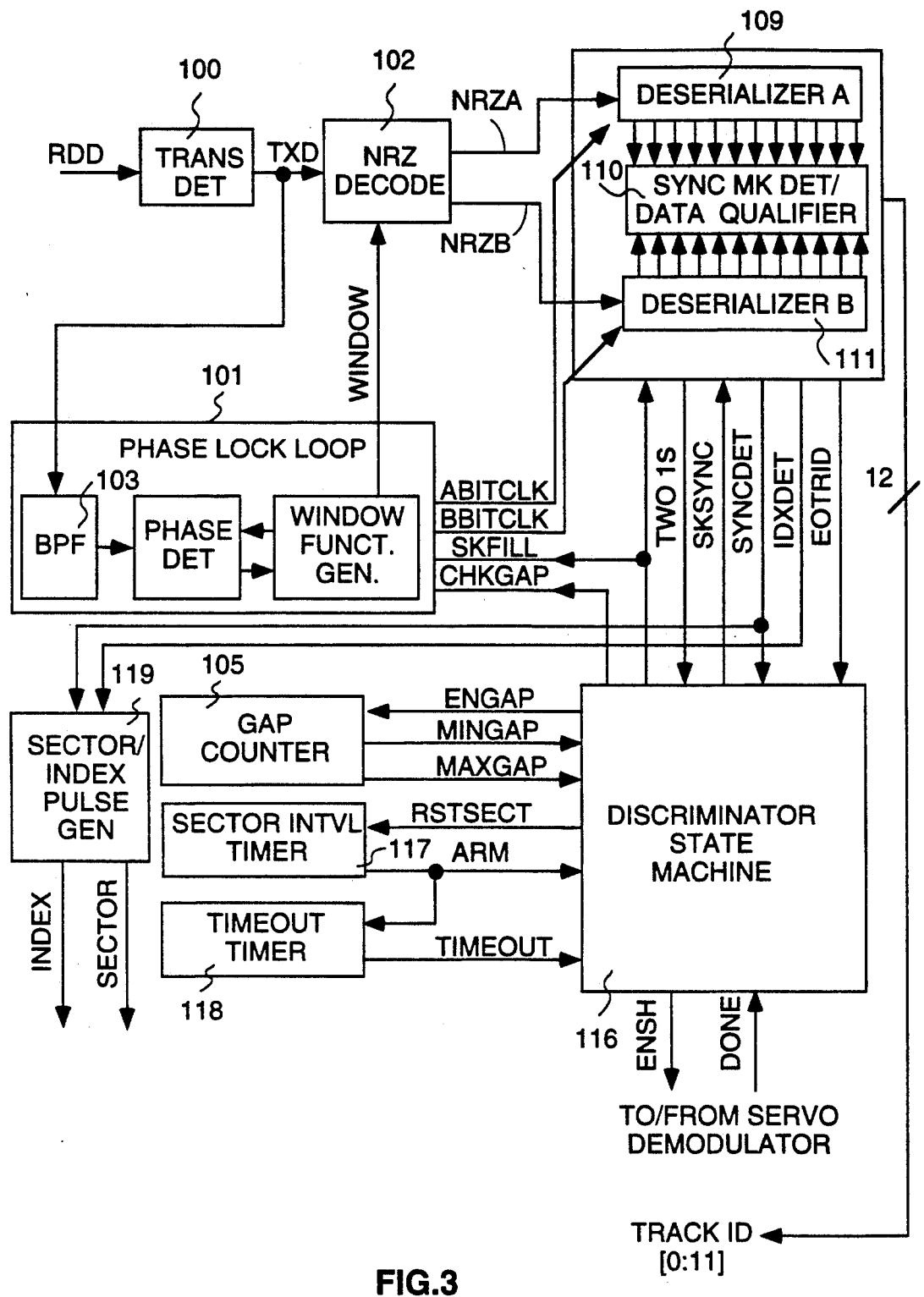
FIG. 3 is a block diagram of a portion of the discriminator circuitry of this invention, including the digital phase lock loop and signal serializers/deserializers.
Figure 7A:
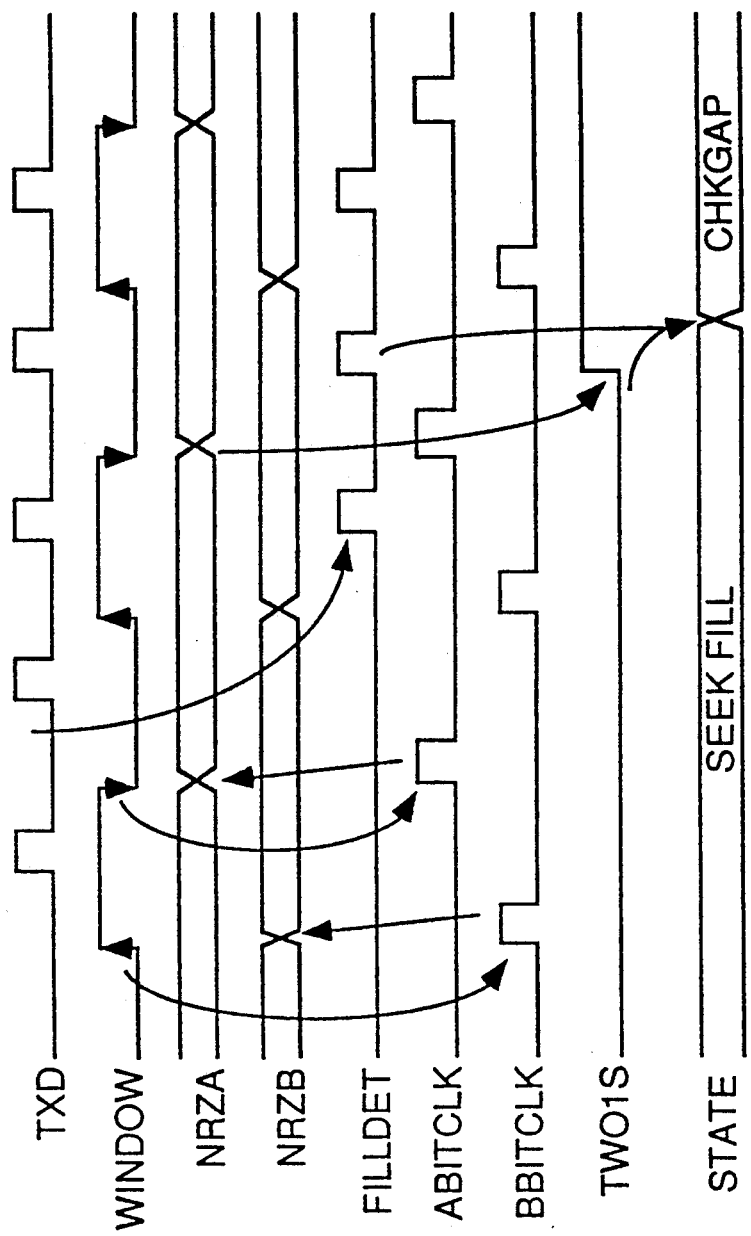
FIGS. 7A and 7B are timing diagrams showing signals relative to state transitions during different operations of the servo system.
Figure 7B:
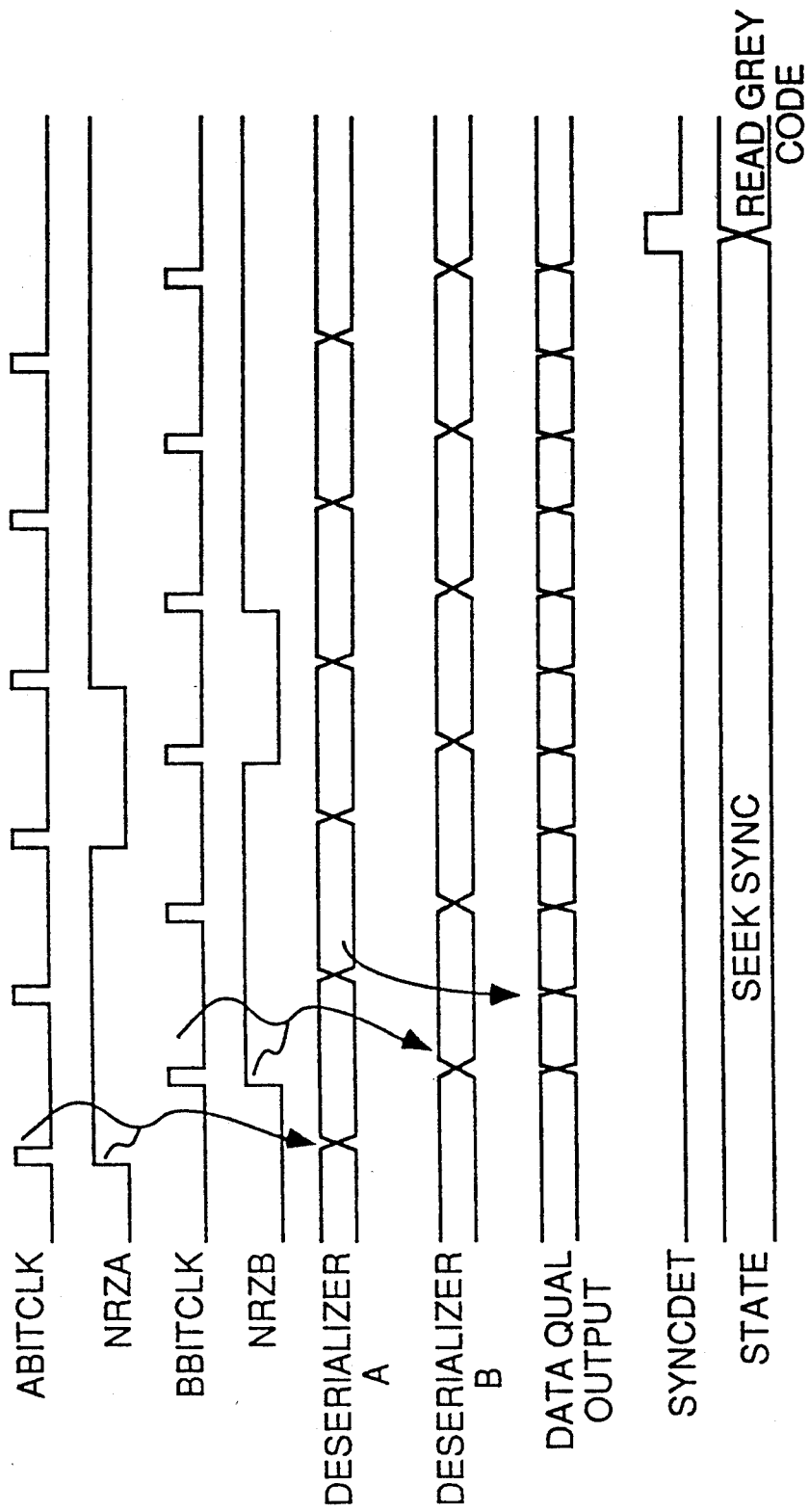

The main discriminator state machine 116 of FIG. 3 controls the various elements of the invention. Its state flow is depicted in the state diagram of FIG. 9 and some of its timing is shown in FIGS. 7A and 7B. The Idle state 134 is present in the state machine with assertion of the RESET signal while the START signal is not asserted. Upon assertion of the START signal, the state machine transitions to the Seek Fill Code state 135 until detection of the fill code is made. The criteria for the detection are: (1) the fill code pattern is matched in the pattern matcher 103 in the phase lock loop 101, and (2) two or more consecutive "1" bits are shifted into the deserializers 109 and 111 of FIG. 3, as shown in FIG. 7A.

When these conditions are met, the signal FILLDET goes true, which transitions the state machine to the Check Gap state 136. Upon receiving the FILLDET signal, the main state machine asserts the ENGAP signal to a gap counter 105 of FIG. 3, enabling this counter. When the DC erase block 144 is traversed by the read head, this results in no transition pulses, thereby asserting an ALLZERO signal to gap counter 105. The gap counter is cleared to its initial state every time the ALLZERO signal is deasserted, which happens every time during fill code field 142. Therefore, counter 105 aligns itself with the start of the DC erase field automatically before the start of counting.

The nominal duration of the DC erase field 144 is seven sine wave periods, but after six cycles, gap counter 105 asserts a MINGAP signal to the state machine. Upon receiving the MINGAP signal, the state machine transitions to the Seek Sync state 137 and asserts SKSYNC signal to a data qualifier and SYNC mark detector circuit 110 of FIG. 3. If the SYNC mark is not located by the data qualifier within fourteen cycle periods, gap counter 105 asserts the MAXGAP signal to the state machine which then returns to the Seek Fill Code state 135.

SYNC mark detector circuit 110 samples the least significant 6 bits of the deserializer's output and compares them to the index SYNC mark pattern 146A and sector SYNC mark pattern 146B. When a pattern match is found, SYNCDET signal is asserted, along with either IXDET if it is a index SYNC mark that is found, or SCDET if it is a sector mark, through a sector/index pulse generator 119. The actual detector is implemented as depicted in FIG. 8.

SYNC mark detector PLA 115 (FIG. 8) matches the bit patterns of the sector or index SYNC mark, and "TWO 1s," for registering two consecutive "1" bits for fill code detection as described earlier. An additional qualification is added to prevent false detection by requiring the first two bits of the SYNC mark to be perfect; that is, the contents of deserializers 109 and 111 as supplied through gates 125 to PLA detector 115 must agree. This is implemented in logic circuitry 125 associated with detector 115 and indicated by the "TWO 1s" line on detector 115.

Figure 9:
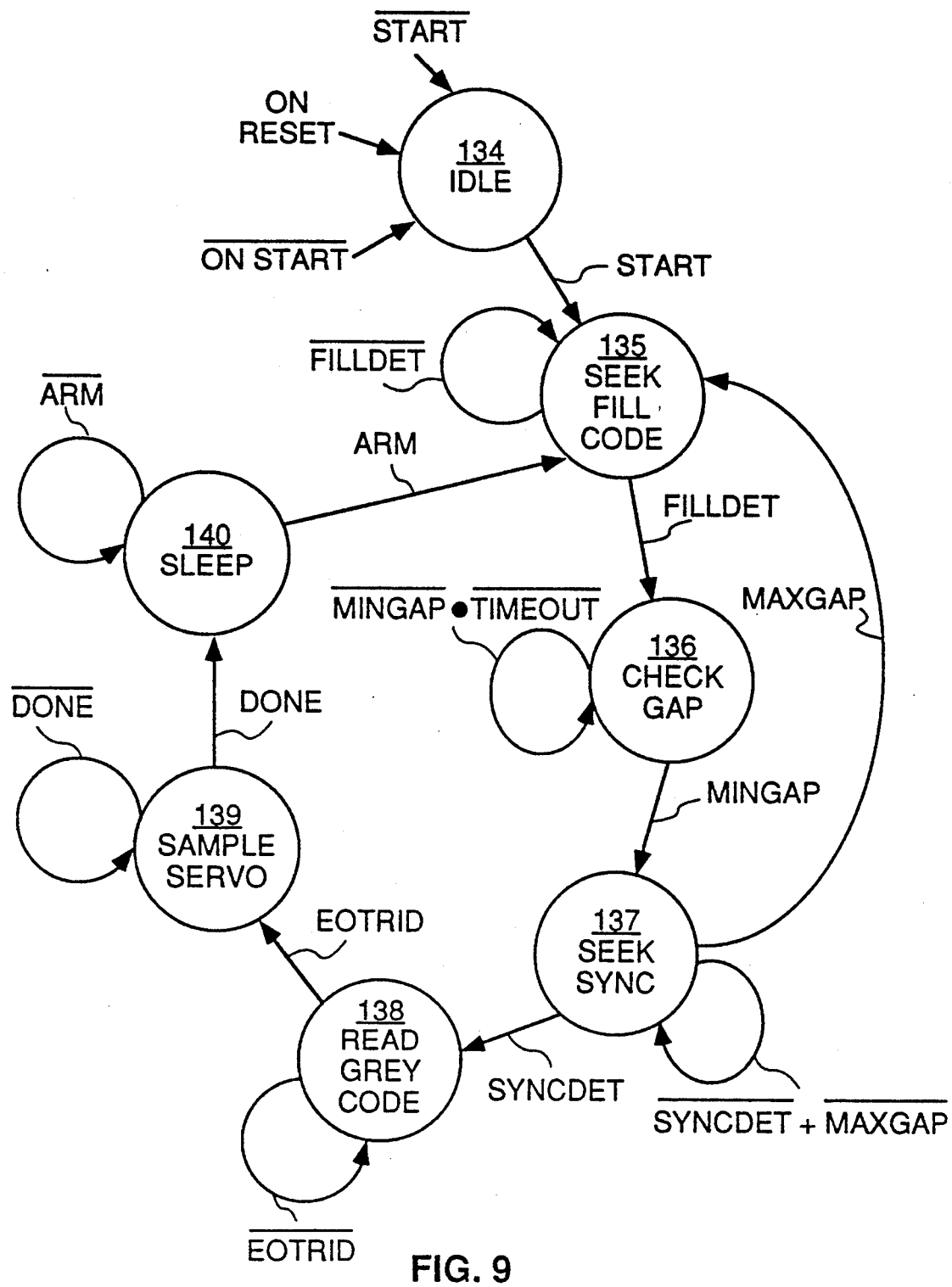
FIG. 9 is a state transition diagram showing some of the operations of the present invention.

The signal SYNCDET transitions the state machine to the Read Grey Code state 138 as shown in FIG. 9 and 7b. When SYNCDET is asserted, the leading phase of the above-mentioned window function is determined by examining the current window phase. From that point, the deserializers are clocked only twelve more times to shift in the 12 bit track ID code. At the end of the twelfth bit, the EOTRID (End Of Track ID) signal is asserted, shifting the state machine into the Sample Servo state 139.

The discriminator then asserts the ENSH (enable sample and hold) signal to activate the accompanying demodulator, which is a combination of the set of a peak detector and three sample and hold circuits, three channels of analog-to-digital converter (ADC), one for each of the C, A and B servo bursts, and its own state machine. It sequentially enables each of the sample and hold circuits to acquire the servo bursts, then convert them to digital values by means of the ADC, as is described in more detail below. The demodulator utilizes the timing signal from the discriminator to initiate the sequence, then asserts DONE signal when the sampling is completed.

The discriminator then enters the SLEEP state 140, where it remains dormant until the ARM signal from the sector interval timer 117 (FIG. 3), whose function is to be detailed subsequently, is asserted. When the discriminator is initially activated (e.g., during power-up), it does not know where the magnetic head is located on a track, and consequently, it operates in a so-called "KIWYSI" (Know It When You See It) mode. In this mode, the discriminator is always examining information from the read channel (RDD signal), searching for a valid servo block.

As discussed above, the servo format is carefully chosen so that nothing else on the track appears similar to a valid servo block, but nevertheless, there is always a finite possibility of a false detection when it operates in KIWYSI mode. Since every false detection or missed detection impacts the disk memory system's throughput and may jeopardize data integrity, the probability of such errors must be kept to a minimum. The preferred embodiment of the invention provides for such an operation mode called time discrimination mode. It utilizes a Sector Interval Timer 117 and a Timeout Timer 118 of FIG. 3.

Every time a servo block is detected; that is, when the SYNC mark for the servo block is found, Sector Interval Timer 117 is activated. It is programmed to have a time duration roughly equal to the time interval between the SYNC mark of a servo block and the fill code burst of the following servo block. At the end of servo discrimination, when the servo demodulator returns to the DONE signal, the state machine enters the SLEEP state 140 and stops listening to its RDD input signal. Therefore, any information that could be mistaken for a servo block is masked out.

Just before the fill code for the next servo block appears, sector timer 117 expires, asserting ARM signal. This causes state machine 116 to return to the Seek Fill Code state 135, to start another discrimination cycle.

When the sector timer expires, it automatically starts Timeout Timer 118. This timer spans the time interval between the start of the fill code and the end of the SYNC mark. If the SYNC mark is not found by the time it should have been, timer 118 expires, asserting the TIMEOUT signal. This is a case of a missed detection; the error flag to that effect is set, and state machine 116 is forced back to the Seek Fill Code state 135. At this point, neither of timers 117, 118 is active, and therefore the system is running in the KIWYSI mode.

The servo discrimination system described above is somewhat more complicated than those of the prior art, but its flexibility and reliability are significantly better than those of the prior art. Previously, a discriminator of this magnitude was not realizable on a small form factor disk drive system, but the present architecture is well suited for a Large Scale Integrated (LSI) circuit implementation, making it possible to be utilized on a system that employs disks as small as 3.5 inches or smaller.

The advantages of the present invention include:

1. Wider range of tolerance to motor speed variations, instantaneous speed variations, and input signal jitters without requiring any post assembly adjustment.

2. Capability to of handle more complicated servo format, capable of retrieving such information as index/sector SYNC marks and track ID codes. By reprogramming a few structures, it can handle a wide variety of servo formats.

3. Tolerance to drop out errors, due to the usage of a dual deserializer scheme, with the capability to warn the external processor of the occurrence of the error.

4. Exact and logical discrimination criteria carried out by the state machine minimizes the probability of false detection.

5. Time discrimination mode further reduces the probability of false detection, and the Timeout timer provides the ability to identify the missed detection.

Servo Burst Amplitude Detection

Figure 10:
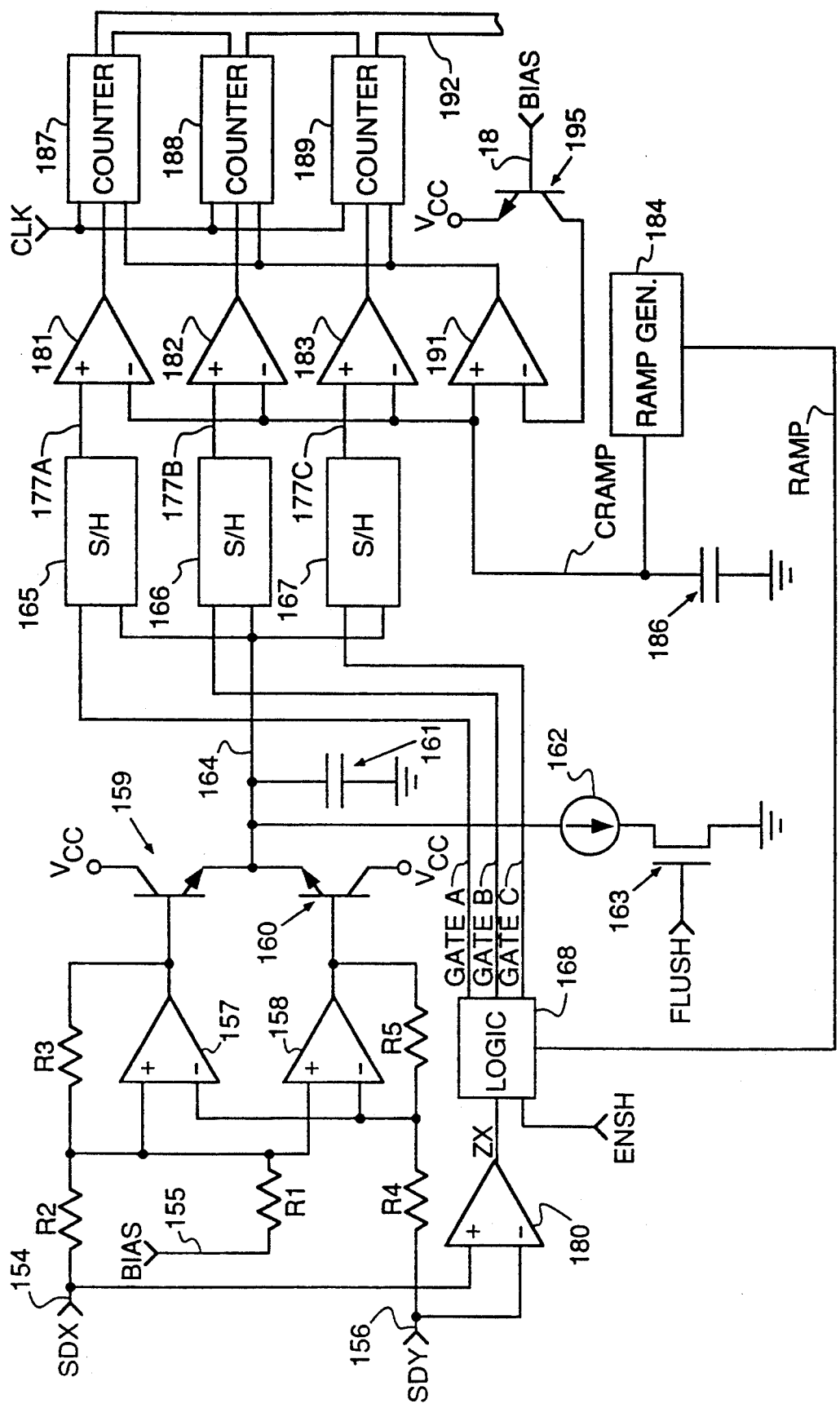
FIG. 10 is a block diagram showing the elements of the servo burst pulse detection circuitry of the invention.

FIG. 10 illustrates circuitry for detecting the amplitudes of the different servo burst signals. The differential input signal, represented by inputs SDX and SDY, is received in analog sample and hold element 49 in FIG. 1C on inputs 154 and 156, respectively. The input signals are provided to a first differential amplifier 157 and a second differential amplifier 158. Signal SDX is provided to the non-inverting input of amplifier 157 and the inverting input of amplifier 158, while signal SDY is provided to the non-inverting input of amplifier 158 and the inverting input of amplifier 157. A bias voltage is provided on an input line 155 through filter resistor R1 to the differential amplifiers. Resistors R2, R3, R4 and R5 are provided for balancing of amplifiers 157 and 158.

The outputs of the first and second differential amplifiers 157 and 158 are electrically connected to the base terminals of parasitic NPN bipolar transistors 159 and 160, respectively. The collectors of both transistors are connected to the power supply voltage VCC. The emitters of the transistors are connected to a capacitor 161 for storage of the peak signal. Parasitic bipolar transistors are an inherent feature of common CMOS integrated circuit technology and their construction is well known. Care is normally taken to avoid their adverse parasitic effect on digital CMOS circuitry as is well appreciated by those having ordinary skill in the art of integrated circuit design. However, parasitic NPN bipolar transistors 159 and 160, when used in combination with differential amplifiers 157 and 158, resistors R1, R2, R3, R4 and R5 and capacitor 161, provide means for detecting the magnitude of the differential input signal and storing this magnitude. In the preferred embodiment, resistors R2, R3, R4, and R5 are sized to provided unity gain rectification of the peak signal.

A means for discharging capacitor 161 to clear the peak signal comprises a current source 162 connected to ground through a first MOS device 163. The gate of device 163 is enabled by a control signal FLUSH. The voltage on capacitor 161 is provided on a line 164 sequentially to a first sample-and-hold (S/H) circuit 165, a second sample-and-hold circuit 166, and a third sample-and-hold circuit 167. Control of the sample-and-holds is provided by logic circuit 168, which corresponds to servo-read timing and control element 46 in FIG. 1C. Circuit 165 is enabled by signal GATE A, circuit 166 is enabled by signal GATE B, and circuit 167 is enabled by signal GATE C, all of which signals are generated by logic circuit 168.

Figures 11, 12:
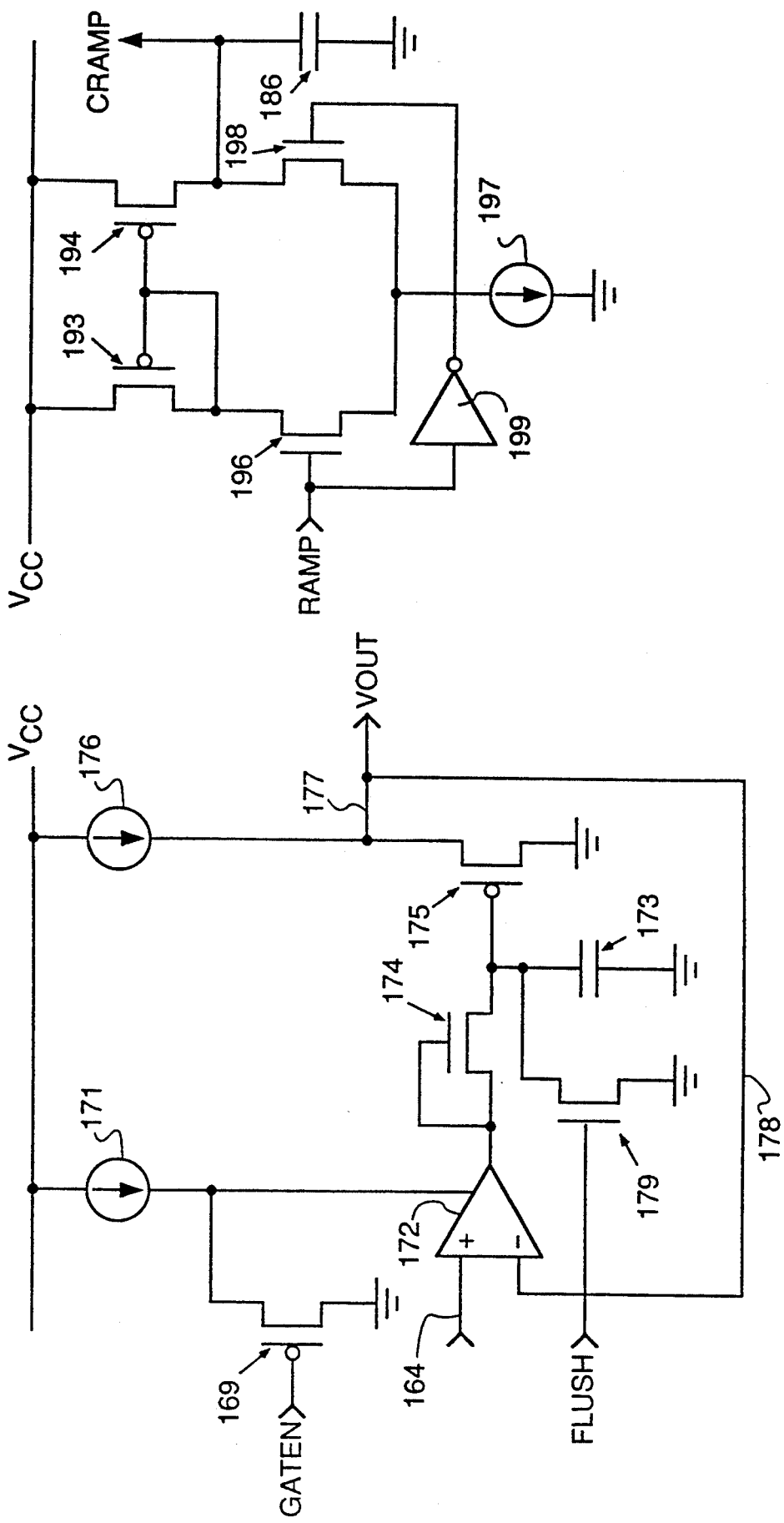
FIG. 11 is a schematic diagram of sample-and-hold circuits used in the burst detection circuitry of the invention.
FIG. 12 is a schematic diagram of the ramp generator circuitry used in the burst detection circuitry.

The details of the sample-and-hold circuits are best seen in FIG. 11. The enabling signal represented in FIG. 11 as GATEN is connected to the gate of a first MOS P-channel device 169. A current source 171 provides power to a sample-and-hold operational amplifier 172. MOS device 169 is connected between current source 171 and operational amplifier 172, sinking current from the source to ground until the GATEN signal disables device 171, allowing current to amplifier 172. Input to amplifier 172 is provided from capacitor 161 of the peak detector (FIG. 10) on line 164, and the output of amplifier 172 is stored on a second capacitor 173. A diode connected MOS device 174 provides high frequency filtering for the circuit.

Capacitor 173 is connected to the gate of a second P-channel MOS device 175, steering current from a third current source 176 from ground to the output line 177 of the sample-and-hold. Feedback from the output is provided to amplifier 172 on a line 178. A second N-channel MOS device 179 is connected to discharge sample-and-hold capacitor 173 to clear the stored voltage value. Gate control of device 179 is accomplished using the FLUSH signal.

Logic circuit 168 is triggered to enable the sample-and-hold circuit by an enabling signal ENSH (FIG. 10) indicating the presence of servo burst data on the incoming differential signal. ENSH is generated by the servo burst detection circuits described above. Presence of the differential signal is detected by a comparator 180 providing a zero crossing signal ZX. The logic circuit evaluates ZX and ENSH for appropriate timing to sequentially assert GATEC, GATEA, and GATEB.

Analog-to-digital (A/D) conversion of the voltages stored in the sample-and-hold circuits is accomplished by connecting the outputs of the sample-and-hold circuits designated 177A, 177B, and 177C in FIG. 10 to differential comparator amplifiers 181, 182, and 183, respectively. Comparison of the voltage present in each sample-and-hold circuit is made with a voltage ramp signal created by a ramp generator 184 charging a capacitor 186. Ramp generator 184 is enabled by logic circuit 168 through the signal RAMP. Three counter circuits are provided to time the ramp to the cross-over point for the voltage value present in each sample-and-hold circuit. Counter 187 times the ramp to cross over for sample-and-hold 165 through differential comparator 181, counter 188 times the ramp to cross over for sample-and-hold 166 through differential comparator 182, and counter 189 times the ramp to cross over for sample-and-hold 167 through differential comparator 183. Clocking for the counters is provided by the signal CLK.

In the embodiment shown, each counter is the equivalent of a pair of 74LS163 logic circuits cascaded using the carry output. To reduce offset, a fourth differential comparator 191 compares the ramp voltage to a bias provided through a transistor 195. In the embodiment shown, the bias present on the fourth differential comparator is substantially equal to the peak detector bias. The output of differential comparator 191 enables the counters.

The circuitry shown in FIG. 10 allows simultaneous evaluation of the voltage stored in each of the three sample-and-hold circuits. The digitized voltage data is provided on the output bus 192 for use by microprocessor 36 as a measure of head position. Microprocessor 36 calculates the desired head position and outputs the resulting value to DAC register and range control element 48 in FIG. 1C for servo control.

As shown in FIG. 12, the ramp generator comprises a mirrored current source having a diode connected P-channel MOS device 193 and a normally connected P-channel MOS device 194, each having a source connected to power supply voltage VCC. An N-channel MOS device 196 gated by the RAMP signal connects the control leg of the mirrored P-channel MOS device pair 193, 194 to a current source 197, sinking current to ground. A second N-channel device 198 gated by the RAMP signal inverted through an invertor 199 connects capacitor 186 for discharging through current source 190. Capacitor 186 is also connected to the follower MOS device 194 for charging to produce the voltage ramp signal CRAMP supplied to differential comparator amplifiers 181, 182, 183 (FIG. 10) comparing the sample-and-hold voltages.

In a manner well known to persons skilled in the art of analog circuit design, the design characteristics of matched P-channel MOS devices 193 and 194 are chosen such that the charging current flowing through MOS device 194 to capacitor 186 will be equal in magnitude to the discharge current flowing through current source 197. Control of the symmetry and magnitude of the charging and discharging currents of capacitor 186 allows for control of the charging and discharging time of capacitor 186, thus controlling circuit response time characteristics.

Figure 13:
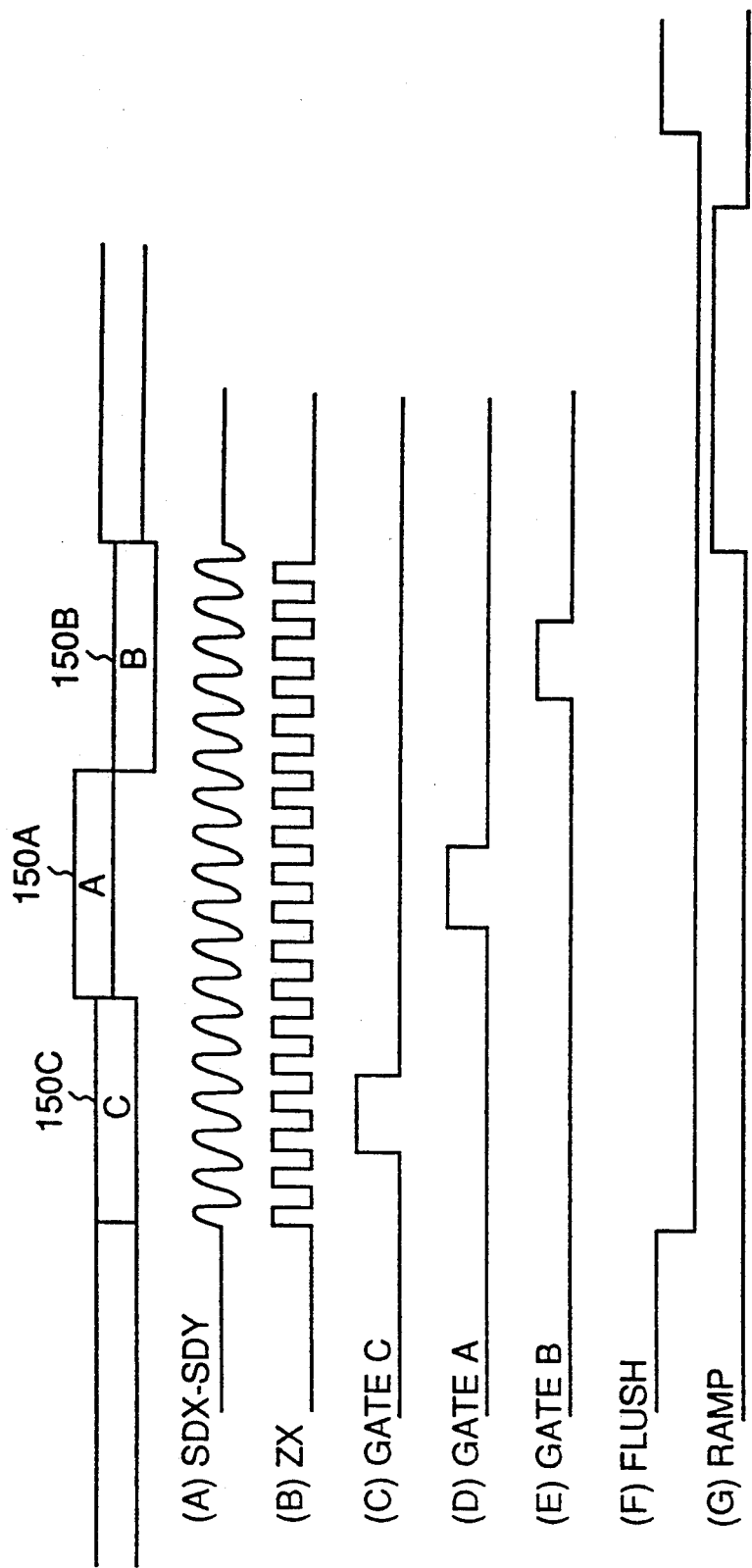
FIG. 13 is a timing diagram showing input signal and control logic signal levels during burst detection.

As described above, the differential signal represented as SDX-SDY is generated through the read head and amplifier system. Upon assertion of the ENSH signal in logic circuit 168, the FLUSH signal is deasserted, allowing the storage capacitors in the system to be charged. As seen in FIG. 13, the presence of the SDX-SDY signal (FIG. 13A) at comparator 180 (FIG. 10) results in zero crossing detections and an output ZX (FIG. 13B) from the comparator. Upon receipt of the ZX signal, the logic circuit enables the first sample-and-hold circuit by asserting the GATEC signal (FIG. 13C). The peak amplitude of the differential signal for the C burst is stored in capacitor 161 of the peak detector. Upon assertion of the GATEC signal on capacitor 173 (FIG. 11), this peak value is transfered to sample-and-hold circuit 167. The logic circuit then sequentially asserts the GATEA signal (FIG. 13D) and GATEB signal (FIG. 13E), enabling the sample-and-hold circuits 165 and 166, respectively, to store the detected amplitude data from the A burst and the B burst, respectively.

Logic circuit 168 then asserts the RAMP signal, causing charging of capacitor 186 (FIG. 12) by the ramp generator, as described above. When the voltage on capacitor 186 exceeds the voltage provided to differential amplifier 191 by the bias voltage, counting is initiated on counters 187, 188, and 189. When the ramp voltage CRAMP exceeds the voltage value stored by any sample-and-hold circuit, 165, 166, or 167, the associated differential amplifier disables the associated counter, providing a digitized voltage measurement. Upon deassertion of the RAMP signal, MOS device 198 is enabled, causing discharge of capacitor 186 through current sink 197. The FLUSH signal is then asserted, discharging capacitor 161 (FIG. 10) and the capacitor 173 (FIG. 11) in each of the sample-and-hold circuits, resetting the circuitry for the next servo burst. Counters 187, 188, 189 may be reset using the FLUSH signal or other appropriate signal.

What is claimed is:

1. A system for detecting information in a train of signals, said signals in said train having pairs of associated transitions therein; said system comprising:

means for detecting said transitions in said signals in said train;

means, connected to said detecting means for generating a first window signal associated with the first transition of a pair of associated transitions and for generating a second window signal, associated with the second transition of said pair of associated transitions;

decoding means responsive to said transitions in said signal train and to said window signals;

first storage means receiving signals from said decoding means corresponding to a first one of said transitions;

second storage means receiving signals from said decoding means corresponding to a second one of said transitions; and means for comparing said transition signals in said first storage means with said transition signals in said second storage means to determine associated transitions in said pairs of transitions.

2. A system in accordance with claim 1 in which each of said window signals has a nominal size, including means for adjusting the size of said first and said second window signals from said nominal size in dependence upon the time of occurrence of said transitions relative to said window signals.

3. A system in accordance with claim 2 including means for dividing each of said window signals into a plurality of phases.

4. A system in accordance with claim 3 including:

means for detecting which of said plurality of phases of said window signals is nearest in time to the occurrence of one of said transitions, and;

means for adjusting the size of one of said window signals in accordance with said detected phase.

5. A system in accordance with claim 4 in which one of said window signals is shortened from said nominal size in response to detection of one of said transitions near the beginning of one of said window signals.

6. A system in accordance with claim 4 in which one of said window signals is lengthened from said nominal size in response to detection of one of said transitions near the end of one of said window signals.

7. A system in accordance with claim 1 including means responsive to the lack of detection of one of said transitions in any associated pair of said transitions in said signal train for indicating an error condition in said detected transitions.

8. A system for detecting information in a train of signals, said signals in said train having pairs of associated transitions therein; said system comprising:

means for detecting said transitions in said signals in said train;

means for generating a first window signal associated with the first one of a pair of associated transitions and for generating a second signal, associated with the second of said one pair of associated transitions; each of said first and said second window signals having a nominal size;

decoding means responsive to said transitions in said signal train and to said window signals;

means, connected to said detecting means and said generating means, for examining said transition signals during the occurrence of said first and second window signals to detect associated transitions in said pairs of transitions; and means connected to said examining means, for adjusting the size of said first and said second window signals from said nominal size in dependence upon the time of occurrence of said transitions relative to said window signals.

9. A system in accordance with claim 8 including means for dividing each of said window signals into a plurality of phases.

10. A system in accordance with claim 9 including means for detecting which of said plurality of phases of said window signals is nearest in time to the occurrence of one of said transitions, and adjusting the size of one of said window signals in accordance with said detected phase.

11. A system in accordance with claim 10 in which one of said window signals is shortened from said nominal size in response to detection of one of said transitions near the beginning of one of said windows.

12. A system in accordance with claim 11 in which one of said window signals is lengthened from said nominal size in response to detection of one of said transitions near the end of one of said window signals.

* * * * *